(12) United States Patent
Speight et al.

(10) Patent No.: US 10,027,401 B2
(45) Date of Patent: *Jul. 17, 2018

(54) WIRELESS COMMUNICATIONS SYSTEM AND METHOD

(75) Inventors: Timothy James Speight, Bristol (GB); Paul William Piggin, Chippenham (GB)

(73) Assignee: Nvidia Corporation, Santa Clara, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 13/588,955

(22) Filed: Aug. 17, 2012

(65) Prior Publication Data

US 2013/0044623 A1 Feb. 21, 2013

(30) Foreign Application Priority Data

Aug. 19, 2011 (GB) .................................. 1114343.5

(51) Int. Cl.
*H04L 1/00* (2006.01)
*H04B 7/155* (2006.01)
(Continued)

(52) U.S. Cl.
CPC ......... *H04B 7/15528* (2013.01); *H04W 52/46* (2013.01); *H04W 56/0045* (2013.01)

(58) Field of Classification Search
CPC ... H04W 84/047; H04W 88/04; H04W 40/22; H04W 4/005; H04W 72/0406; H04B 7/15542; G01S 5/0018
(Continued)

(56) References Cited

U.S. PATENT DOCUMENTS 8,155,016 B2 4/2012 Zhang et al.
8,406,161 B2 3/2013 Zhou et al.
(Continued)

FOREIGN PATENT DOCUMENTS

CN 102026398 A 4/2011
EP 1919095 A2 7/2008
(Continued)

OTHER PUBLICATIONS

English translation for JP2008017069A.*
(Continued)

*Primary Examiner* — Marsha D. Banks Harold
*Assistant Examiner* — Elton Williams

(57) ABSTRACT

A wireless communications system is described which comprises a base station, a relay device, and a terminal device. The terminal device is operable to transmit a message to the base station via the relay device. The relay device is operable to add a relay header to the message received from the terminal device, the relay header comprising control information for controlling the transmission of subsequent messages from the terminal device to the relay device. The relay device is also operable to relay the message having the relay header added to the base station. By adding such control information to messages being relayed from the terminal device to the base station on the uplink, subsequent downlink communications from the base station to the terminal device can include the control information generated at the relay device (or transmission parameters derived from the control information).

24 Claims, 15 Drawing Sheets

(51) Int. Cl.
*H04W 52/46* (2009.01)
*H04W 56/00* (2009.01)

(58) Field of Classification Search
USPC .................................................. 370/252, 315
See application file for complete search history.

(56) References Cited

U.S. PATENT DOCUMENTS

| | | | | |
|---|---|---|---|---|
| 8,406,726 | B2* | 3/2013 | Youn et al. | 455/404.1 |
| 2007/0110016 | A1* | 5/2007 | Shen et al. | 370/338 |
| 2008/0090585 | A1 | 4/2008 | Hart et al. | |
| 2008/0212573 | A1* | 9/2008 | Noldus | H04M 15/06 370/355 |
| 2008/0285499 | A1* | 11/2008 | Zhang | H04B 7/155 370/315 |
| 2008/0285501 | A1* | 11/2008 | Zhang et al. | 370/315 |
| 2008/0316954 | A1 | 12/2008 | Zheng | |
| 2009/0010199 | A1* | 1/2009 | Adachi et al. | 370/315 |
| 2009/0016290 | A1* | 1/2009 | Chion et al. | 370/329 |
| 2009/0154533 | A1* | 6/2009 | Khayrallah | H04B 7/15592 375/211 |
| 2010/0111061 | A1* | 5/2010 | Zheng | H04W 84/047 370/338 |
| 2010/0214978 | A1 | 8/2010 | Chen et al. | |
| 2011/0164577 | A1* | 7/2011 | Cai et al. | 370/329 |
| 2012/0188931 | A1* | 7/2012 | Lee et al. | 370/312 |

FOREIGN PATENT DOCUMENTS

| | | | |
|---|---|---|---|
| EP | 2144467 | A2 | 1/2010 |
| JP | 2008017069 | A * | 1/2008 |
| TW | 201119475 | A | 6/2011 |
| WO | 2008108591 | A2 | 9/2008 |
| WO | 2011025272 | A2 | 3/2011 |
| WO | 2011086426 | A1 | 7/2011 |

OTHER PUBLICATIONS

LTE; Evolved Universal Terrestrial Radio Access (E-UTRA); Medium Access Control (MAC) Protocol Specification (3GPP TS 36.321 version 10.2.0 Release 10).*
"Support for a Simplified Uplink-Only Relaying Mode;" IEEE 802.16; Nov. 7, 2006.*
"3rd Generation Partnership Project; Technical Specification Group Radio Access Network; Evolved Universal Terrestrial Radio Access (E-UTRA); Medium Access Control (MAC) Protocol Specification (Release 10)," 3GPP TS 36.321, V10.2.0, Jun. 2011, 54 pages.
Taiwan office action dated May 16, 2014, 10 pages.
Translation of German Office Action dated Sep. 8, 2015, 5 pages.
Baum, K., et al., "Support for a Simplified Uplink-Only Relaying Mode," IEEE 802.16 Broadband Wireless Access Working Group, Nov. 7, 2006, 13 pages.

* cited by examiner

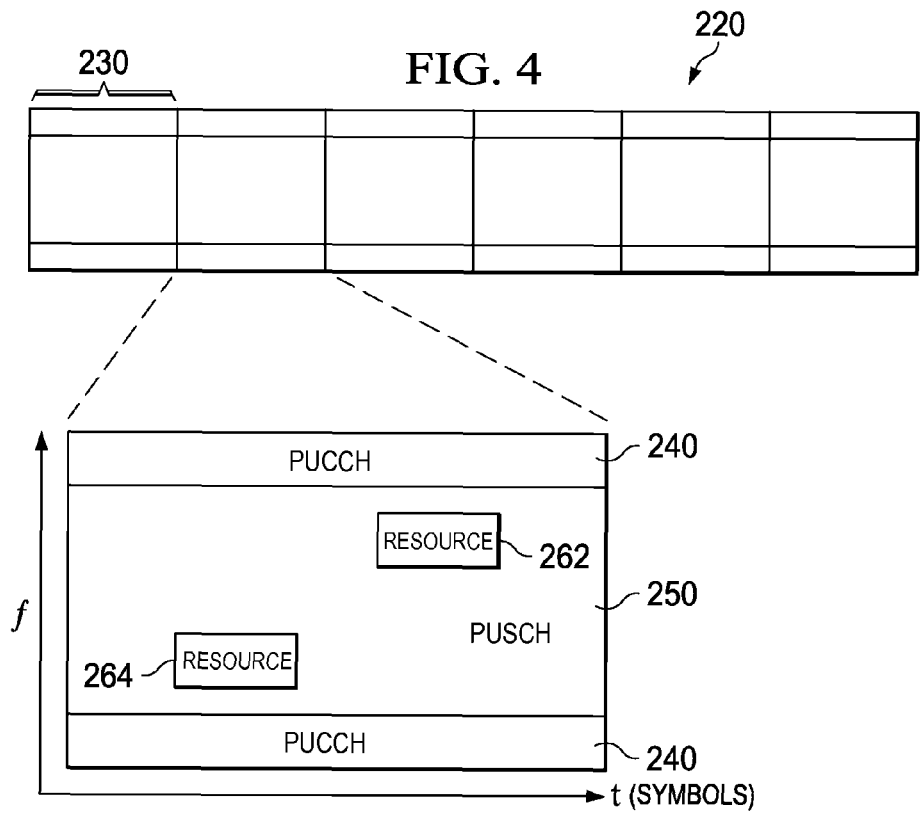
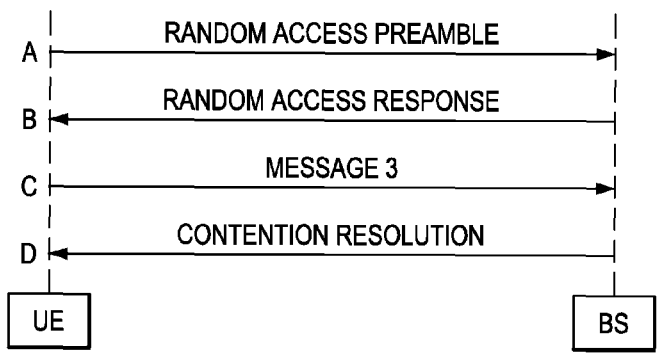

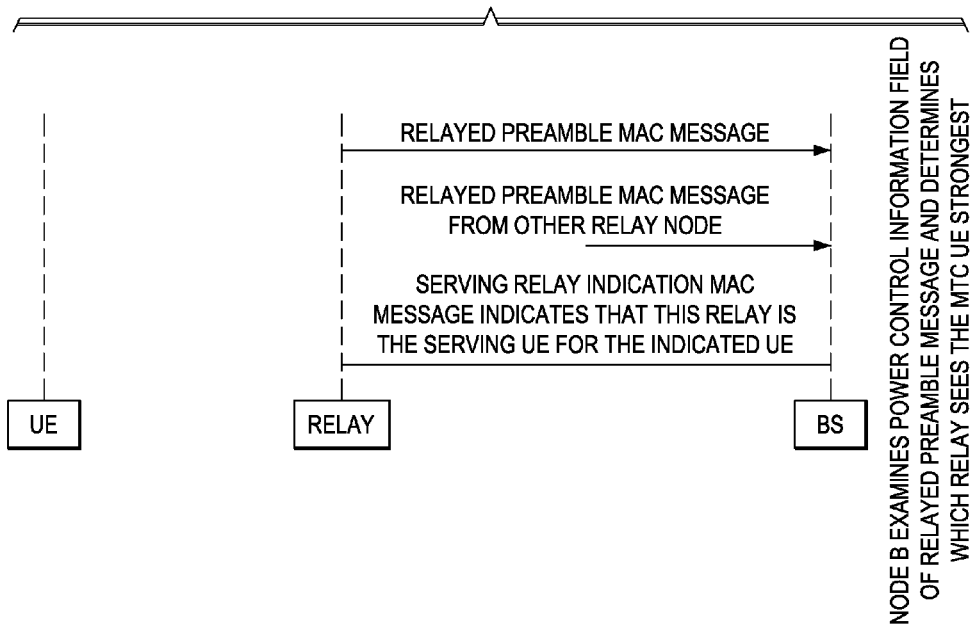

| RA-RNTI | S |
| RAPID | R |

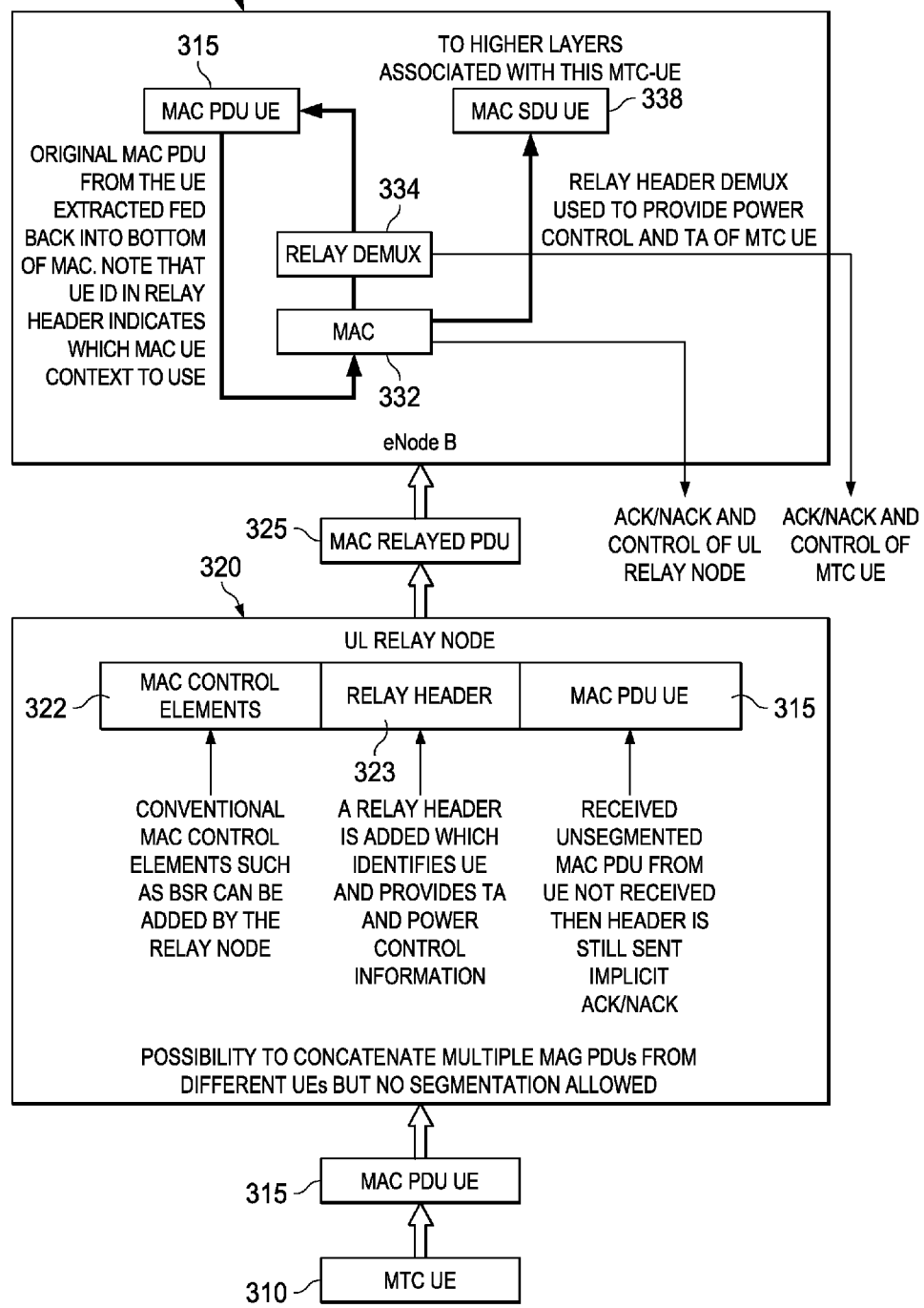

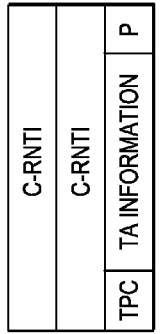
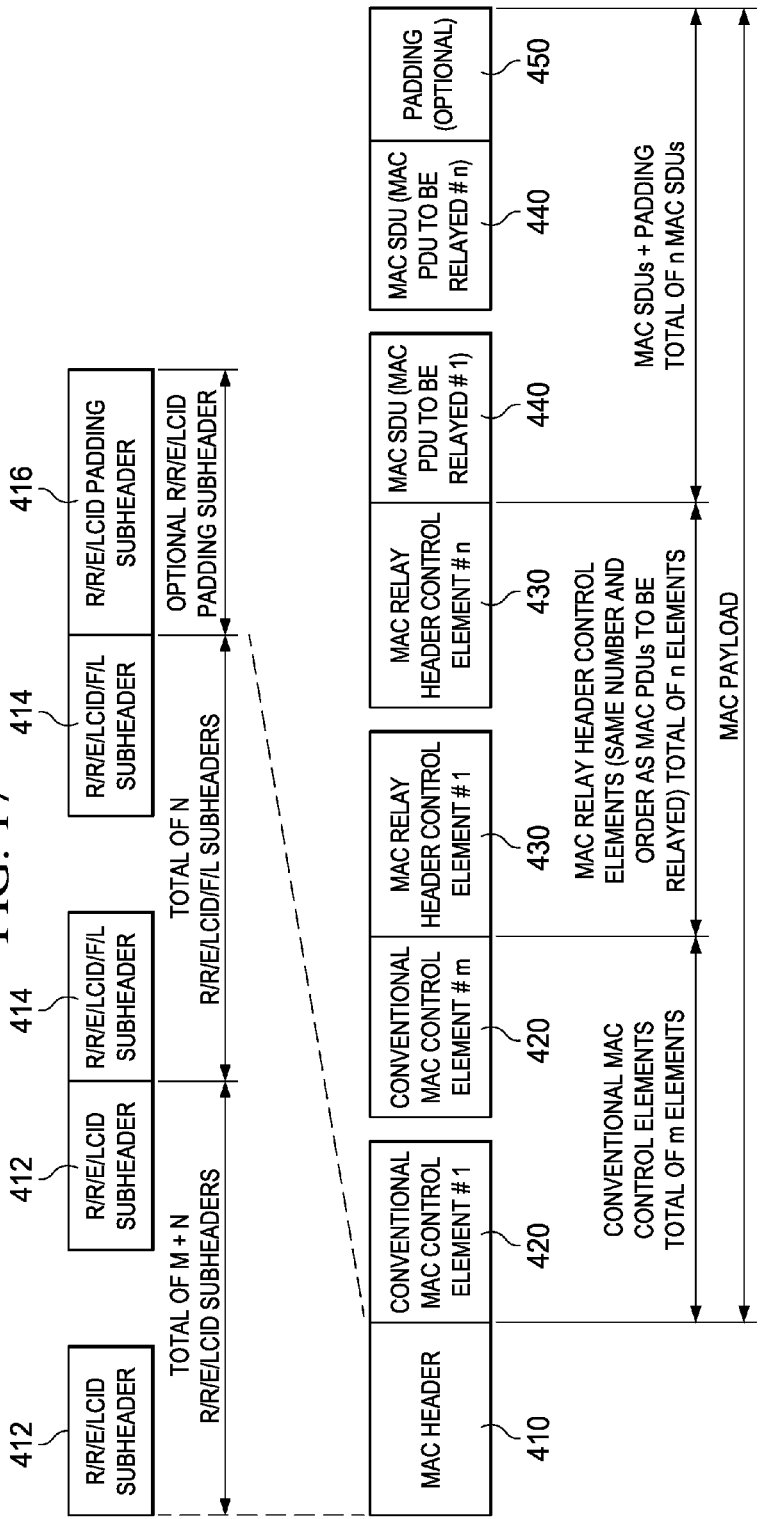

WIRELESS COMMUNICATIONS SYSTEM AND METHOD

CROSS-REFERENCE TO RELATED APPLICATION

This application claims priority from GB Application No. 1114343.5 filed on Aug. 19, 2011, entitled "WIRELESS COMMUNICATIONS SYSTEM AND METHOD," commonly assigned with the present invention and incorporated herein by reference.

FIELD OF THE INVENTION

The present invention relates to a wireless communications system and method. Further aspects of the present invention relate to a base station, a relay device, a terminal device and a computer program.

BACKGROUND OF THE INVENTION

Machine Type Communication (MTC) is being discussed in various wireless communication standards bodies as a new trend of wireless technology of communication network applications which typically do not require human interaction.

A broad definition of MTC is an automated communication network to and from machines. One major category of MTC devices are expected to have the characteristics of very low power consumption, very small data transmissions and a very large number of terminals. An example MTC application that fits within this category may for example be energy consumption monitoring of home appliances for smart grid systems.

Uplink-only relaying is a network topology which may be used to address the issue of transmit power limitation in low-cost Machine Type Communication (MTC) devices when deployed, for instance, in macro cellular Long-Term-Evolution (LTE) networks. In general there is sufficient system gain on the downlink (base station to terminal device) to support MTC devices (or User Equipment UE) (MTC-UE) at the cell edge of the macrocell of the eNodeB (eNB) but with the low output power of the MTC devices the uplink (terminal device to base station) system gain is significantly reduced compared with the downlink. The use of a single hop uplink-only relay node (MTC-RN) can be used to address this issue and close the link budget for MTC-UE. A single hop may be assumed provided that the MTC-RN can be expected to have similar characteristics to an LTE UE. In a network where relay nodes (also referred to herein as relay devices) are utilised to relay uplink data from the terminal devices to the eNodeB, the eNodeB may be referred to as a donor eNodeB (DeNB).

An uplink only single-hop relay is described in US2008/0285499.

SUMMARY OF THE INVENTION

According to one aspect of the present invention, there is provided a wireless communications system, comprising:
 a base station;
 a relay device; and
 a terminal device; wherein
 the terminal device is operable to transmit a message to the base station via the relay device; and
 the relay device is operable to add a relay header to the message received from the terminal device, the relay header comprising control information for controlling the transmission of subsequent messages from the terminal device to the relay device; and
 relay the message having the relay header added to the base station.

A problem with uplink-only relaying is that the relay device cannot feed back control information to the terminal device to support efficient future transmissions over the air interface between the terminal device and the relay device. However, by adding such control information to messages being relayed from the terminal device to the base station on the uplink, subsequent downlink communications from the base station to the terminal device can include the control information generated at the relay device (or transmission parameters derived from the control information).

As such, the base station may be operable to transmit the control information contained in the relay header to the terminal device, and the terminal device may then be operable to transmit one or more subsequent messages to the relay device based on the control information included in the relay header.

In one embodiment, processing at the relay device takes place at the Medium Access Control (MAC) layer. In this case, a MAC relay header control element can be used to provide uplink-only relaying functionality. The MAC relay header control element may include ACK/NACK, power control and timing advance information for the terminal device. The power control and timing advance information can then be transmitted to the terminal device to control the power level and timing of transmissions from the terminal device to the relay device.

In particular, in an embodiment, the relay device is operable
 to measure a received signal power of the message received from the terminal device; and
 to set power control information in the control information for controlling a power level of a subsequent transmission from the terminal device to the relay device. The power control information may specify a power offset from the received signal power (the power level at which the message was received from the terminal device at the relay device). The terminal device may be responsive to the power control information to control the transmission power of a subsequent transmission to the relay device.

Similarly, in an embodiment the relay device is operable
 to measure a propagation time delay between the terminal device and the relay device of the message transmitted from the terminal device to the relay device;
 to determine, based on the propagation time delay, a required timing advance offset for a subsequent transmission from the terminal device to the relay device so that a receive time of the subsequent transmissions at the relay device is synchronised with a receive time of transmissions from other terminal devices; and
 to specify said timing advance offset in the control information.

The terminal device may be responsive to the timing advance information to control the timing of a subsequent transmission from the terminal device to the relay device.

The relay device may be operable to transmit the relay header to the base station in relation to an expected message from the terminal device even if the expected message was not correctly received at the relay device.

The message from the terminal device can be considered to be expected if uplink resources have been allocated to the terminal device by the base station.

In an embodiment, the relay device is operable to combine a plurality of messages received from one or more terminal devices into a relay message, the relay header being added to the relay message and having a respective relay control element for each of the plurality of messages received at the relay device, each relay control element comprising the control information for controlling the transmission of subsequent messages from the terminal device originating the message to which the relay control element relates; and to transmit the relay message to the base station.

The relay header may comprise an identification of the terminal device which transmitted the message. A relay control element for an expected message from a terminal device may be included in the relay header even if the expected message is not correctly received at the relay device. In this case, the relay control element may comprise an indication of whether the associated message is present in the relay message. The base station may be responsive to the absence of an expected message in the relay message to transmit a negative acknowledgement message to the terminal device.

In an embodiment, the relay header comprises further control information for controlling the transmission of data between the relay device and the base station.

In an example ordering for the relay message, the relay control elements in the relay header are in the same order as the messages to which they correspond. The relay control elements in the relay header may be positioned after the further control information. When a plurality of messages from the same terminal device are present in the relay message, they may be positioned within the relay message in the order in which they were received at the relay device.

The relay device is operable to process and relay the message received from the terminal device at a Medium Access Control (MAC) layer in a protocol stack. It has been recognised that it is possible to provide adequate relaying functionality without resorting to higher layers in the protocol stack.

The messages received at the relay device from the terminal devices may be MAC Protocol Data Units. The relay message may be a MAC Protocol Data Unit. In this case, the base station may be operable to process the MAC Protocol Data Unit of the relay message at the MAC layer in a protocol stack to extract a MAC Protocol Data Unit of the message from the terminal device;

to process the MAC Protocol Data Unit of the message from the terminal device at the MAC layer; and to pass the processed MAC Protocol Data Unit of the message from the terminal device to a higher level in the protocol stack.

According to another aspect of the present invention, there is provided a method of wirelessly communicating data from a terminal device to a base station via a relay device, comprising:

transmitting a message from the terminal device to the base station via the relay device;

at the relay device, adding a relay header to the message received from the terminal device, the relay header comprising control information for controlling the transmission of subsequent messages from the terminal device to the relay device; and relaying the message having the relay header added to the base station.

According to another aspect of the present invention, there is provided a base station for receiving wireless communications from a terminal device via a relay device, the base station comprising:

a receiver for receiving a message transmitted from the terminal device via the relay device; wherein the message comprises a relay header added by the relay device, the relay header comprising control information for controlling the transmission of subsequent messages from the terminal device to the relay device.

According to another aspect of the present invention, there is provided a relay device for wirelessly relaying data from a terminal device to a base station, the relay device comprising:

a receiver for receiving from the terminal device a message for relaying to the base station; and a transmitter for adding a relay header to the message received from the terminal device, the relay header comprising control information for controlling the transmission of subsequent messages from the terminal device to the relay device and relaying the message having the relay header added to the base station.

According to another aspect of the present invention, there is provided a terminal device for wirelessly communicating data to a base station via a relay device, the terminal device comprising:

a transmitter for transmitting a message to the base station via the relay device; wherein the relay device is operable to add a relay header to the message received from the terminal device, the relay header comprising control information for controlling the transmission of subsequent messages from the terminal device to the relay device; and relay the message having the relay header added to the base station.

Further aspects and features of the present invention are defined in the appended claims.

BRIEF DESCRIPTION OF THE DRAWINGS

Example embodiments of the present invention will now be described with reference to the accompanying drawings in which like parts have the same designated references and in which:

FIG. 4 schematically illustrates an example uplink data and control channel structure for use in the network shown in FIG. 2;

FIG. 5 schematically illustrates a random access procedure for a mobile terminal to connect to a network;

FIG. 8 schematically illustrates a new MAC control element for relaying a random access request to a base station;

FIG. 9 schematically illustrates a modified random access response (RAR) message;

FIG. 10 schematically illustrates a method for arbitrating between multiple possible serving relays;

FIG. 15 schematically illustrates the encapsulation and relay of MAC messages at a relay device;

FIG. 16 schematically illustrates an example format for a MAC relay header control element;

FIG. 17 schematically illustrates an example MAC relayed PDU in which all indicated MTC-UE MAC PDUs are present;

DESCRIPTION OF EXAMPLE EMBODIMENTS

Figure 1B:
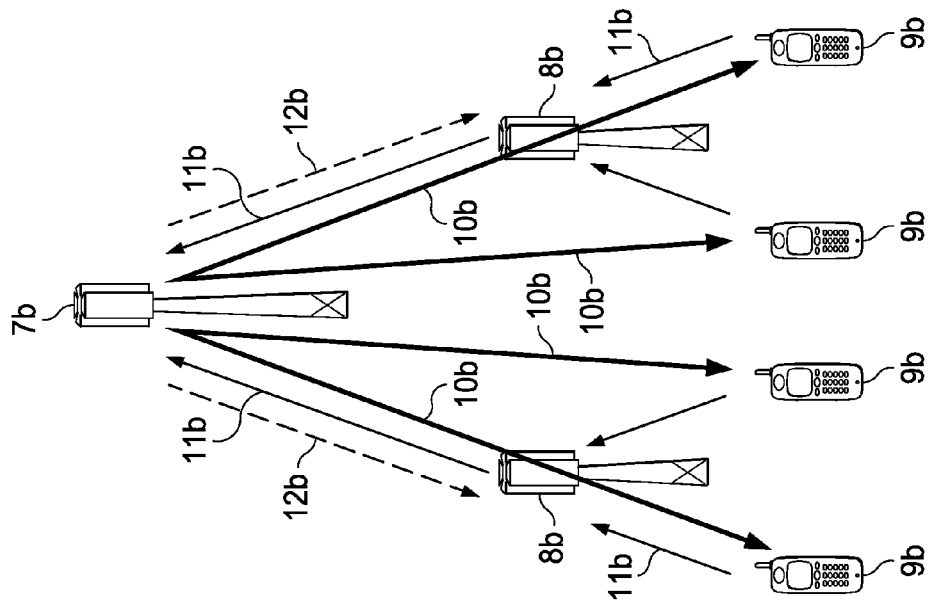
FIGS. 1A and 1B provide a comparison of a symmetric uplink/downlink multi-hop signalling scenario and an asymmetric uplink/downlink signalling scenario for a relay network.
Figure 1A:
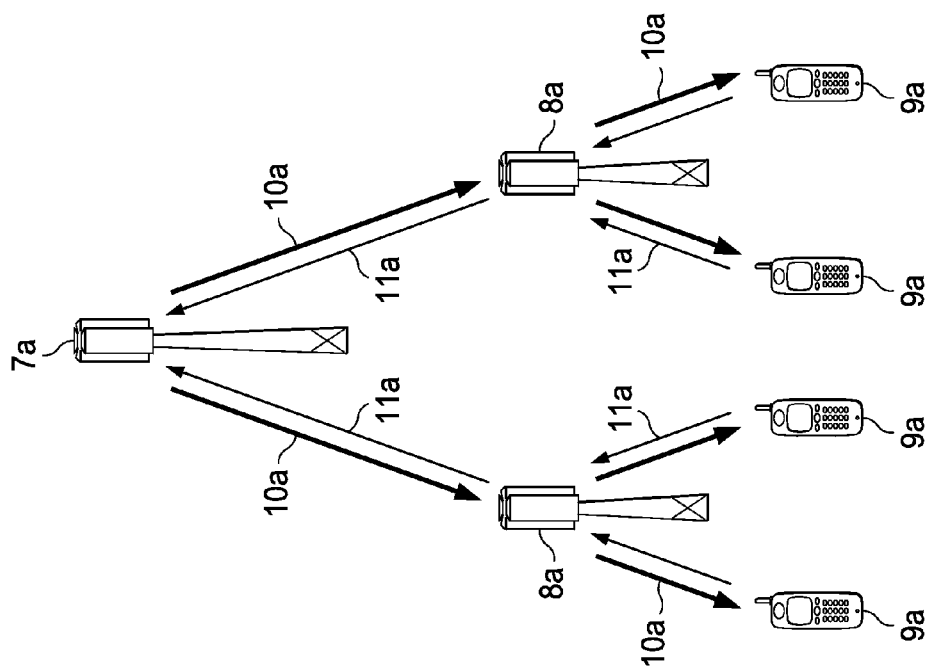

Referring first to FIGS. 1A and 1B, a comparison of a symmetric uplink/downlink single-hop signalling scenario and an asymmetric uplink/downlink signalling scenario when applied to a relay network is provided. FIG. 1A illustrates a symmetric uplink/downlink case in which communications are hopped both on a downlink 10a from a base station 7a to several terminal devices 9a via relay devices 8a, and also on an uplink 11a from the terminal devices 9a to the base station 7a via the relay devices 8a. FIG. 1B illustrates an asymmetric uplink/downlink case in which communications are direct on a downlink 10b from a base station 7b to a terminal device 9b, but are single-hopped on an uplink 11b from the terminal device 9b to the base station 7b via the relay devices 8b. The base station 7b may also transmit control signalling on a downlink 12b (dashed lines in FIG. 1B) to the relay devices 8b in order to control the operation of the relay devices 8b. Notably though there is no transmission from the relay devices 8b to the terminal devices 9b. It will be appreciated that the asymmetric uplink/downlink relay configuration of FIG. 1B will receive a number of benefits. Firstly, it will be understood that hopping permits lower power transmissions to be used, but increases transmission time. Hopping of both the control signal and the data signal (as conducted in FIG. 1A) takes a relatively long time to be conveyed, due to the processing delay on reception/retransmission at an intermediate step in the route. In contrast, the transmission time is reduced in relation to the control signal sent from the base station (BS) to the terminal by transmitting the control signal directly. While on the face of it this goes against the low transmission power goals of a relay type network, in reality the base station will not be subject to the same transmission power constraints as the terminal device and relays within the network. Moreover, this arrangement is particularly advantageous for MTC devices because of the relatively high volume of control signalling versus data signalling which is typically utilised for this type of device.

Figure 2:
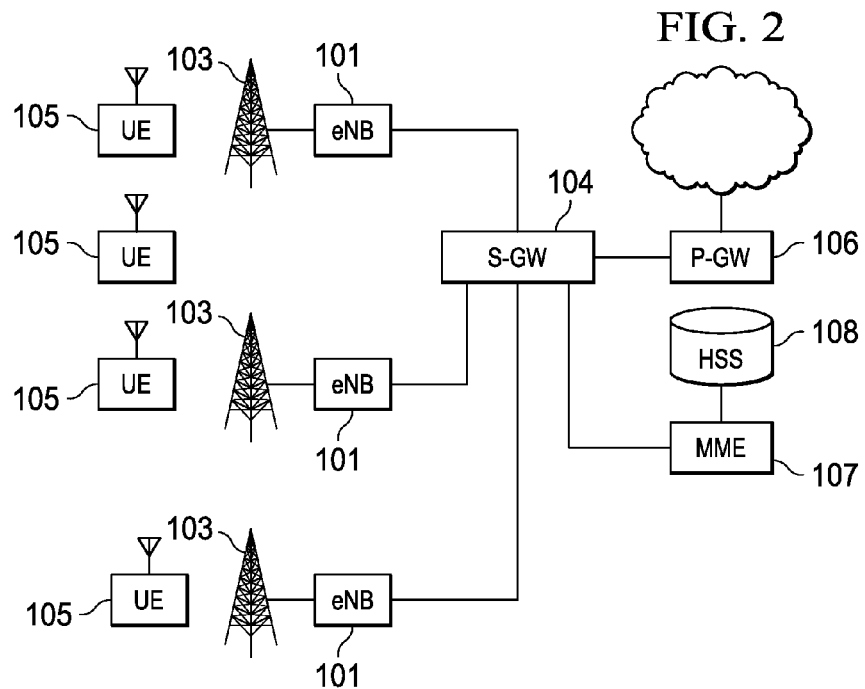
FIG. 2 is a schematic block diagram of a mobile communications network and mobile communications devices forming a communication system which operates in accordance with the 3GPP Long Term Evolution (LTE) standard.

Certain embodiments of the present invention will now be described with reference to an implementation which uses a mobile communications network operating in accordance with the 3GPP Long Term Evolution (LTE) standard. FIG. 2 is a schematic block diagram of a mobile communications network and mobile communications devices forming a communication system which operates in accordance with the 3GPP Long Term Evolution (LTE) standard (Release 8 of the specification). The mobile network includes a plurality of base stations known in the art as enhanced Node-Bs 101 (eNBs) each of which includes a transceiver unit 103 enabling communication of data to and from a plurality of mobile communication devices 105 via a radio interface. Each mobile communication device 105 includes a transceiver for communicating data to and from the eNBs and a USIM which uniquely identifies the mobile communication device.

Each eNB 101 provides a coverage area (i.e. a cell) and communicates data to and from mobile communication devices 102 within the coverage area/cell. Each eNB 101 is connected to a Serving Gateway (S-GW) 104 which routes user data to and from the eNBs 101 and supports mobility when mobile communication devices 105 handover between eNBs 101 as is known in the art.

The mobile network is typically divided into a number of tracking areas each of which comprise a number of eNBs. Together the tracking areas form a network coverage area providing access to the Public Land Mobile Network (PLMN) over a geographic area. The S-GW 104 is connected to a Packet Data Network Gateway 106 (P-GW) which is the network entity from which packet data is routed into and routed out of the network. The mobile telecommunication network also includes a Mobility Management Entity 107 (MME) connected to the S-GW 104. The MME 107 is responsible for authenticating mobile communication devices 105 attempting to access the network by retrieving subscriber profile information stored in a Home Subscriber Server 108 (HSS). The MME 107 also tracks the location of each mobile communication device 105 that has joined the network. The eNBs grouped together form a radio network part of the PLMN and the infrastructure equipment of the PLMN, namely the S-GW, MME and P-GW form a core network part of the PLMN.

Figure 3:
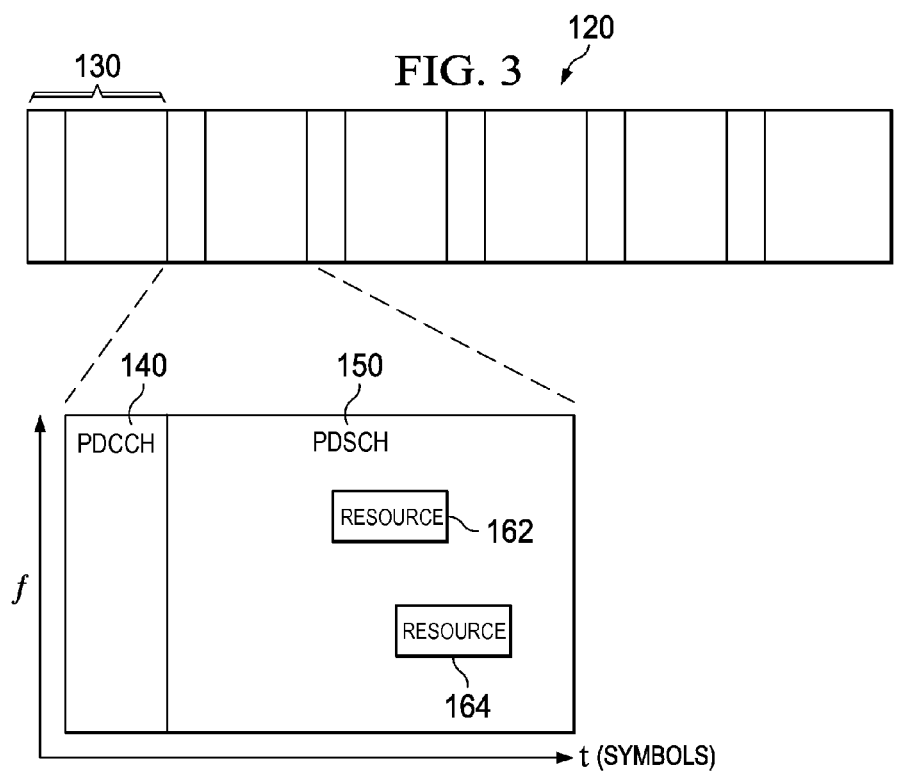
FIG. 3 schematically illustrates an example downlink data and control channel structure for use in the network shown in FIG. 2.

FIG. 3 schematically illustrates an example downlink data and control channel structure for use over the air (Uu) interface between the eNBs 101 and communication devices 105 in the LTE based network of FIG. 2. According to the LTE standard, a physical downlink frame is used to communicate control signalling and data on the downlink (base station to terminal device). FIG. 3 is a somewhat simplified form of this, for example a LTE frame usually includes 10 sub-frames but only 6 sub-frames 130 have been represented for the downlink frame 120 of FIG. 3. Below the representation of the LTE frame 120 in FIG. 3 is an expanded version of one of the sub-frames 130. In each sub-frame 130, a Physical Downlink Control Channel (PDCCH) 140 is shown which occupies time and frequency resources that stretch across the entire frequency band (vertical) and across 1 to 3 symbols in the time axis (horizontal). In contrast the Physical Downlink Shared CHannel (PDSCH) 150 is comprised of a plurality of time and frequency resources which are allocated via the PDCCH. In effect, the PDCCH provides the mobile communications devices with the resource allocations and the corresponding addressing information (for example the radio network temporary identifier—RNTI). A mobile communications device can therefore, based on the RNTI, know which resource allocations it should decode to receive data intended for (addressed to) it. The data may be either data for this mobile communications device only or for all mobile communications devices in the cell. In FIG. 3, two resource blocks 162, 164 are highlighted. These could be allocated to a particular terminal device by control information provided in the PDCCH 140 in association with the RNTI of that particular terminal device. The terminal device would then know to decode data transmitted in that frequency/symbol allocation.

In a similar fashion, FIG. 4 schematically illustrates an example uplink data and control channel structure for use over the air (Uu) interface between the eNBs 101 and communication devices 105 in the network shown in FIG. 2. As with the downlink, a physical uplink frame 220 is used to communicate control signalling and data on the uplink (terminal device to base station). Again, as with FIG. 3, FIG. 4 is a somewhat simplified form of this. In FIG. 4, the physical uplink frame 220 is divided into sub-frames 230. Below the representation of the LTE frame 220 in FIG. 4 is an expanded version of one of the sub-frames 230. In each sub-frame 230, a Physical Uplink Control Channel (PUCCH) 240 is shown which occupies some time and frequency resources that stretch across the entire time (symbol) band (horizontal) and across a portion of the upper and lower extremities of the frequency band (vertical). In contrast the Physical Uplink Shared CHannel (PUSCH) 250 is comprised of a plurality of time and frequency resources which are allocated via the PDCCH (in the downlink frame). The PDCCH therefore provides the mobile communications devices with the resource allocations and the corresponding addressing information (for example the radio network temporary identifier—RNTI) for the transmitting as well as receiving control signalling and data. A mobile communications device can therefore, based on the RNTI, know which resource allocations it should transmit data on. In FIG. 4, two resource blocks 262, 264 are highlighted. These could be allocated to a particular terminal device by control information provided in the PDCCH 240 in association with the RNTI of that particular terminal device. The terminal device would then know to transmit data using that frequency/symbol allocation.

It will be appreciated that in the context of the asymmetric relay topology described in FIG. 1B, each of the base station, the relay device and the terminal device will make use of these uplink and downlink control and shared channels to communicate information between them. In particular, the base station is able to communicate information to both the terminal device and the relay device using PDCCH and PDSCH. Typically the base station will utilise the PDCCH to indicate to the recipient device where on the PDSCH to look for data intended for the recipient device. The user device is able to communicate information to either the base station (if it is in range) on the PUCCH and the PUSCH, and is also able to communicate information to the relay device on the PUCCH and the PUSCH. The relay device is able to communicate information to the base station on the PUCCH and the PUSCH. In some embodiments the relay device is required to request PUSCH resources for relaying data from the terminal device received at the relay device on the PUSCH. In some embodiments the terminal device and relay device are provided with allocated (time/frequency) resources on the PUCCH which they can utilise (by transmitting on those resources) to request the base station to allocate time/frequency resources on the PUSCH. The PUCCH resources allocated to the terminal device and the relay device may be predetermined. In some embodiments the relay device is aware of the PUCCH resources allocated to the terminal device so that it can receive and relay requests for uplink resources to the base station. The relay device may be aware of the PUCCH resources allocated to the terminal device either due to the predetermined nature of the allocation, or by way of a direct notification from the base station. In an alternative embodiment the terminal device may identify itself in any PUCCH transmissions, enabling the relay device to monitor the PUCCH and pick out any PUCCH transmissions made by a terminal device for which it is responsible.

Random Access Procedure

One mechanism for identifying whether a terminal device needs to be served by a relay device, and the appropriate relay device for the terminal device to use, would be for the relay device to observe the random access procedure. The random access procedure is the method by which a terminal device obtains access to the base station. The random access procedure is conducted in relation to several events, including initial access to the network, connection re-establishment, handover between radio cells, downlink data arrival and uplink data arrival. A schematic illustration of the random access procedure of an LTE network is shown in FIG. 5.

In FIG. 5, a signal flow between a terminal device (UE) and a base station (BS) is shown. Four stages are illustrated. A first stage, A, is the transmission of one or more random access preambles from the terminal device to the base station. The terminal device randomly selects a random access preamble (code sequence) from a group of predetermined random access preambles. The preamble is transmitted on a next available Physical Random Access Channel (PRACH) resource which is available to the terminal device. The position in time and frequency resource of the transmitted random access preamble implicitly provides a temporary identifier (RA-RNTI) for the transmitting terminal device.

If the random access preamble is received at the base station, at a stage B a random access response is transmitted from the base station to the terminal device. The random access response is transmitted on the PDSCH, with the terminal device being informed by the PDCCH of the downlink resources on which the random access response is to be carried. In particular, the PDCCH specifies the temporary identifier derived from the time and frequency resources utilised to transmit the random access preamble, and also indicates a resource block assignment (time and frequency resources) on the PDSCH which will carry the random access response. The terminal device recognises that the random access response is intended for it by way of the temporary identifier, and looks at the assigned resource block in the PDSCH. The MAC header in the Random Access Response on the PDSCH includes a random access preamble identifier which identifies the random access preamble received at the base station at the stage A, a further temporary identifier (C-RNTI) for identifying the terminal device, a grant of uplink resources on the PUSCH, and a timing advance command for adjusting transmission times at the terminal device in dependence on the distance between the terminal device and the base station.

In response to the random access response, at a stage C the terminal device transmits a message 3 ((Radio Resource Control (RRC) Connection Request Message) to the base station. The message 3 is transmitted on the PUSCH resources allocated by the random access response.

In response to the message 3, at a stage the base station sends certain information to the terminal device for contention resolution purposes. This information is transmitted on the PDSCH (again on resources allocated by the PDSCH). This information includes the further temporary identifier (C-RNTI), which becomes the (non-temporary) C-RNTI if contention resolution is successful. The contention resolution information is contained within a UE Contention Resolution Identity control element. If the UE Contention Resolution Identity received at the terminal device from the base station matches a CCCH (Common Control Channel) SDU (Service Data Unit) transmitted in the Message 3, then the terminal device considers that contention resolution has been successful and that the random access procedure has been successfully completed. The reason for providing contention resolution is that more than one terminal device may attempt to access the network using the same random access preamble on the same time and frequency resource. The CCCH SDUs transmitted by the contending terminal devices can be expected to be different and therefore UEs can determined if their random access response is successful by comparing their transmitted CCH SDU with the one sent back to them by the base station in the contention resolution identity MAC control element.

Referring back to stage A, a series of random access preambles may be transmitted by the terminal device at progressively higher power levels (power ramping) if a random access response is not received. It should be noted however that each successive random access preamble will be different.

In order to utilise the random access procedure to identify whether a terminal device attempting to connect to the base station needs to be served by a relay device, the relay device could either:

Report the RA-RNTIs (Random Access Radio Network Temporary Identifier) of all random access attempts it sees to the base station (DeNB) in a new MAC message. The base station would then determine if there were any random access procedures that the MTC-RN observed but it did not receive; or Receive all PRACH (Physical Random Access Channel) preamble attempts and then wait to receive a matching random access response. Only those attempts for which it fails to get a response are reported to the base station.

However there are significant problems with both of these mechanisms associated with the fact that there is no UE context contained in the PRACH preamble and with the power ramping that occurs on the PRACH preamble. Problems include:

Due to the power ramping mechanism a PRACH preamble with no response does not necessarily mean that the terminal device requires the relay device to access the network. The terminal device should be allowed to continue up to its maximum number of RACH preamble attempts (or when maximum power on preamble is reached) and only then should it be considered that the terminal device should be served by the relay device;

Because subsequent preamble retransmissions use a completely new randomly drawn RACH preamble, it is difficult or impossible to determine whether two random access preambles originate from the same terminal device; and There is no way of knowing whether the RACH preamble has been transmitted by a MTC-UE or a non-MTC UE.

Figure 6:
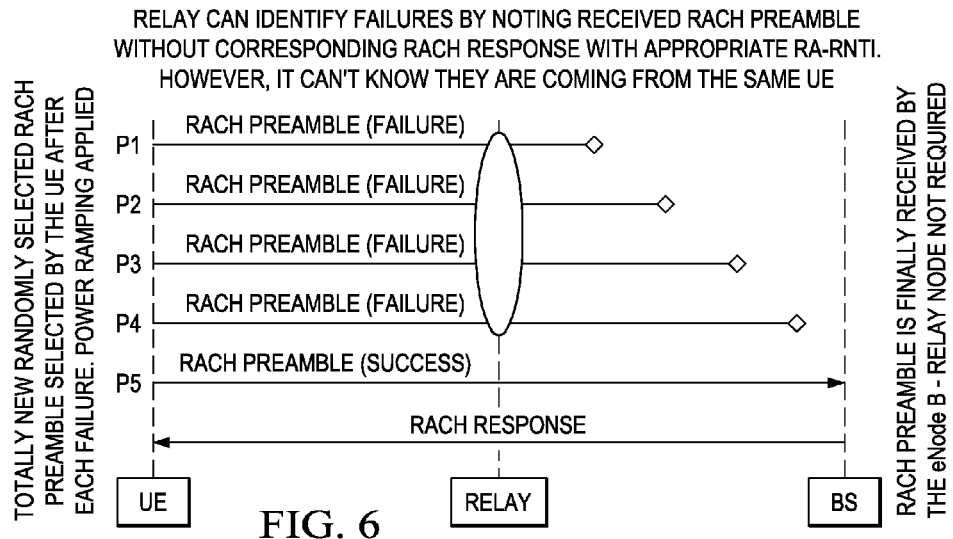
FIG. 6 schematically illustrates User Equipment (UE) Physical Random Access Channel (PRACH) (UE PRACH) power ramping and the interception of random access preambles at a relay device.

FIG. 6 illustrates these problems. In FIG. 6, a terminal device transmits a series of random access (RACH) preambles $P_1$, $P_2$, $P_3$, $P_4$ and $P_5$. These successive transmissions represent totally new randomly selected RACH preambles after each failure, with power ramping being applied. Each of $P_1$, $P_2$, $P_3$ and $P_4$ are received by the relay device, but are not received by the base station. The relay device can identify failures by noting received RACH preambles without a corresponding RACH response using the RA-RNTI, but it cannot know that they are originating from the same terminal device. In the present case $P_5$ is received by the base station, meaning that the relay device is not required by the terminal device in communicating with the base station. A RACH response is transmitted by the base station, and could be detected by the relay device, informing the relay device that it is not required in relation to the terminal device originating $P_5$. However, the relay device is unable to correlate the successful RACH preamble $P_5$ with the failed preambles $P_1$ to $P_4$ and the originating terminal device to identify that it is not required in relation to those failed preambles.

In order to alleviate these problems, when the terminal device reaches its maximum power in the power ramping of random access preambles, a special group of RACH preambles are used instead of the conventional group. The RACH preamble space is partitioned, and currently groups A and B are used as defined in section 5.1.2 of 3GPP TS36.321. To support the present technique, an additional new group, a Maximum Power Group, may be specified. When the terminal device reaches maximum power in the transmission of random access preambles, for example when a PRACH preamble retransmission is transmitted at the same power as a previous PRACH preamble transmission, then the terminal device selects a preamble from the new Maximum Power Group. The transmission of a preamble taken from the Maximum power group effectively notifies the relay device that the originating terminal device has failed to connect directly to the base station. This is shown in FIG. 7.

Figure 7:
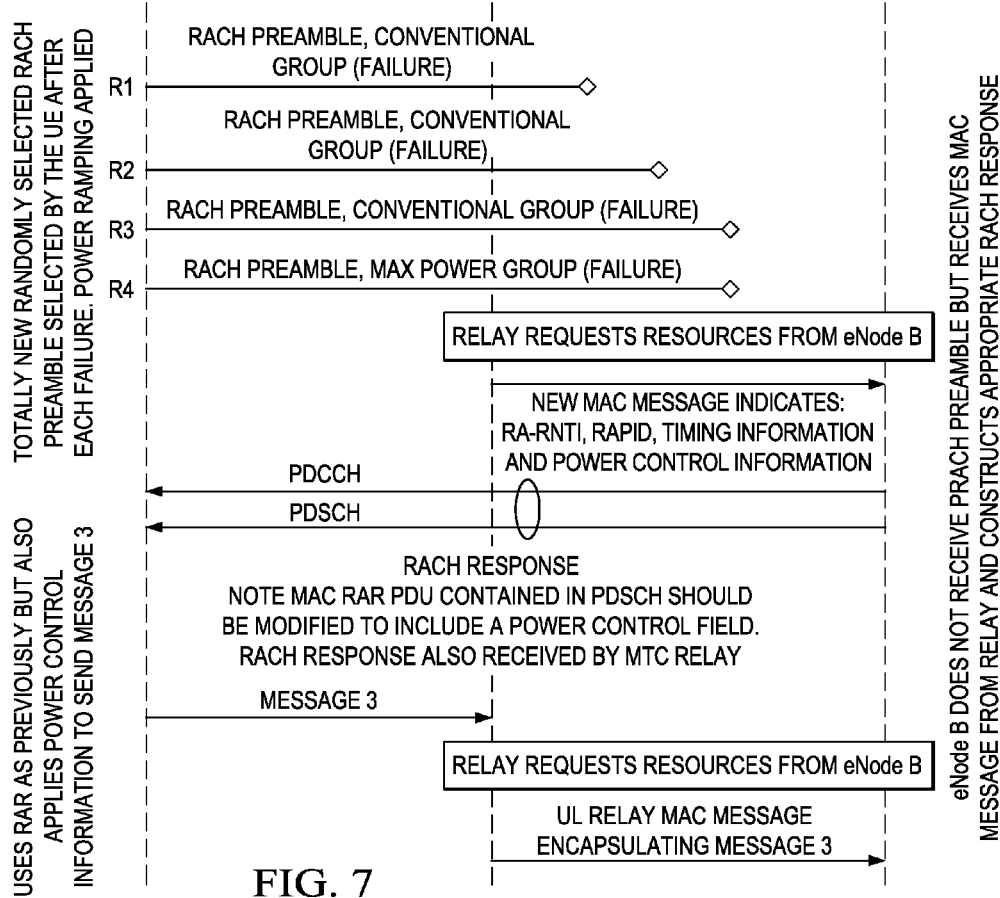
FIG. 7 schematically illustrates a technique for using the random access procedure to trigger a relay to serve a terminal device.

As with FIG. 6, in FIG. 7 the terminal device chooses RACH preambles $R_1$, $R_2$ and $R_3$ as defined conventionally. As these RACH preambles are used and fail the terminal device ramps up the transmission power. In each case a new randomly chosen RACH preamble is used from the conventional set of preambles. These RACH preambles are ignored by the relay device.

The terminal device reaches the maximum RACH preamble power with preamble $R_3$. Note that (as will be discussed below) this maximum may be modified from the current specification which allows the terminal device to use all available power for preamble transmission. System information will define a new preamble group to be used when the new maximum RACH preamble power is reached. The terminal device selects a preamble $R_4$ from the new Maximum PRACH Power Group and transmits the RACH preamble $R_4$. Preferably the preamble selected from the Maximum power group is transmitted at full power (either the same power as the final preamble from the conventional preamble group, or the maximum transmission power of the terminal device). This enables the connection to be made more quickly, in view of the fact that there has already been a delay due to the power ramping with the conventional preambles, and in view of the fact that use of the relay device rather than direct transmission will itself give rise to a further delay. In the alternative, power ramping could also be used with the relay specific preambles (either with the same profile as the conventional preambles or with a modified power ramp). In this case the "Maximum Power Group" would instead be a "Relayed Preamble Group".

Previously, the power ramping of conventional preambles continued up to the maximum transmission power of the terminal device. However, it is possible that this might result in a scenario in which the preamble is successfully received at the base station but messages on UL-SCH (Uplink Shared CHannel) might fail due to a possible sensitivity difference between PRACH (used to transmit the random access preambles) and PUSCH (Physical Uplink Shared CHannel) transmission.

In order to alleviate this problem, the PRACH preamble power control algorithm can be modified to limit the power of the PRACH preamble for the terminal device to be capped a number of decibels below the maximum transmission power of the terminal device.

The relay device detects the use of a RACH preamble $R_4$ in the Maximum PRACH Power Group, and determines the following:
  The RA-RNTI, based on the first subframe of the PRACH index within the subframe (in other words the time/frequency resources used to transmit the RACH preamble);
  The RAPID, i.e. the RACH preamble ID;
  The required timing advance for the terminal device so that it can correctly align transmission of the subsequent Message 3 which will be sent on UL-SCH (this can be determined at the relay device from the propagation time delay of the RACH preamble transmission from the terminal device to the relay device); and optionally
  The power offset needed by the terminal device for Message 3 to be received at the relay device at an appropriate reception power level (this is optional, and may not be required for example if power ramping is applied to the relay preambles). The power offset can be determined at the relay device from the received signal power of the RACH preamble transmission.

The relay device requests time and frequency resources from the base station in the same way as a conventional terminal device (note the relay device has a different RNTI which is separate from that of the terminal device it is relaying). Subsequently the relay device will receive an uplink grant via a PDCCH (Physical Downlink Control Channel) message.

A new MAC control element ('Relayed preamble' control element) is used to transfer the RA-RNTI, the RAPID, the timing advance and the power offset to the base station via the resources allocated to the relay device by the uplink grant.

The base station responds on the PDCCH using the RA-RNTI contained in the relayed preamble message which allocates PDSCH resources used to transport a (potentially modified) MAC RAR (Random Access Response) message. Note that as introduced above it would be beneficial for the RAR message to be modified to include a power control element which provides an offset from the power that the terminal device used for the last transmitted RACH preamble transmission to be used for the transmission of message 3. The reason for this is that the current mechanism whereby the terminal device transmission power for message 3 is based on a fixed offset (transmitted in system information) from the power used for successful preamble power is not applicable because the transmission power of the random access preamble of the maximum power group may be much higher than that required to reach the relay device, or alternatively may be merely adequate. A fixed offset works conventionally because the power ramping results in a successful preamble being transmitted at a power level close to that required. In the present case the offset is based on the power offset specified in the new MAC message. In other ways the random access response is the same as that currently defined, however it is populated from the contents of the relayed preamble message rather than based on the direct reception of the RACH preamble.

The terminal device receives the RAR and acts in the same way as currently specified (with the exception of the power control information if it is included in the message). Thus it sends a Message 3 response in the allocated uplink resources. Meanwhile the relay device may also receive the PDCCH component of the RACH response and will subsequently setup to receive the (potentially modified) MAC RAR contained in the allocated PDSCH resources in order to obtain the uplink grant information and so setup its receivers so that it can receive the subsequent Message 3. Note that it could be regarded as undesirable for the relay device to have to monitor messages ultimately not intended for it. In this case a separate new form of uplink grant could be signalled to the relay device. This new form of uplink grant would not actually allocate uplink resources but would indicate to the relay device that a particular terminal device which is to be relayed by the relay device has been allocated uplink resources that the relay device needs to receive. An example of such a mechanism is described further below.

The relay device receives the Message 3 from the terminal device (this should be correctly timing advanced and, optionally, correctly power controlled). The Message 3 will not be received by the DeNB, which is out of transmission range.

The MTC relay device encapsulates the Message 3 received from the terminal device within a 'relayed UL message' in MAC. The header of this message will contain a TPC (Transmit Power Control) and TA (timing advance)

indication. The relay device requests uplink resources from the base station in order to send the encapsulated message.

The relayed UL message is received by the base station which extracts the encapsulated Message 3 and goes on to complete contention resolution as described previously.

For requesting resources for the terminal device from the base station based on the random access preamble, a new MAC control element, the Relayed preamble message, is provided, with a suggested format being shown in FIG. 8. As can be seen from FIG. 8, the relayed preamble message comprises a reserved part (R), a timing advance part (TA command), a RACH preamble ID part (RAPID), a power offset (Power control info) a Random Access Temporary Identifier (RA-RNTI) and optional padding (PAD). These elements have all been discussed above, with the exception of the padding which is used to pad the message to a required size.

A modified RAR message is schematically illustrated in FIG. 9. In particular, the modified RAR message comprises a reserved part (R), a timing advance part (TA command), an allocation of uplink time and frequency resources (UL grant), the further temporary identifier (C-RNTI), a power offset (Power control info) and optional padding (PAD). This is the same format as previously used for RAR, but with a power control info field added.

In addition, there may need to be a change to the RRC IE 'RACH-ConfigCommon' to include a new group C set of preambles. Note that the signalling currently defined is such that this change would be backwardly compatible to Release 8 LTE.

Relay Arbitration

There may be multiple relay devices which receive the random access preamble in the Maximum PRACH Power Group transmitted by the terminal device. Accordingly, the base station may receive multiple relayed preamble MAC messages for the same terminal device from different relay devices. To address this, a mechanism is required to determine which of the relay devices is to become the serving relay device for the terminal device.

FIG. 10 schematically illustrates this. In FIG. 10, a first relay device transmits a relayed preamble MAC message to the base station. A second relay device also transmits a relayed preamble MAC message to the base station. The base station determines which relay device to use to serve the terminal device, and transmits a serving relay indication MAC message indicating that the recipient relay device is to be the serving relay device for the indicated terminal device. In one example, the base station examines power control information in the relayed preamble MAC message and determines which relay received the preamble transmission from the terminal device most strongly. The relay receiving the preamble transmission most strongly is then selected to be the serving relay device for that terminal device. It will be appreciated that other factors could also be taken into consideration, such as relative traffic loading between the relay devices.

Figures 11, 12:
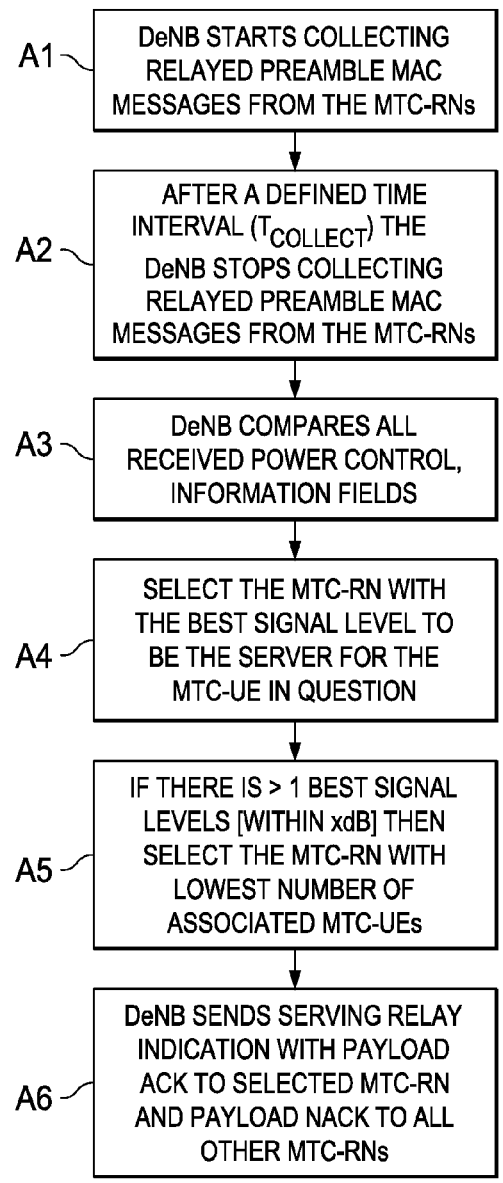
FIG. 11 schematically illustrates a method for determining the most appropriate relay device to serve a terminal device.
FIG. 12 schematically illustrates a MAC control element for indicating which relay device is to serve a terminal device.

A schematic flow diagram is shown in FIG. 11 which demonstrates an example method of arbitrating between multiple relay devices. Firstly, at a step A1 the base station (DeNB) starts collecting relayed preamble MAC messages from the relay devices (MTC-RNs). A number of MTC-RNs see the same PRACH preamble transmitted in the Maximum PRACH Power Group and thus multiple relayed preamble MAC messages are received by the DeNB. These messages will indicate the same RA-RNTI and RAPID but are likely to indicate different power control information fields. At a step A2, after a defined time interval ($T_{collect}$) the DeNB stops collecting relayed preamble MAC messages from the MTC-RNs. A typical defined time interval is expected to be approximately 1 second. Once this has expired a decision can be taken regarding which MTC-RN is to be the serving node based on the power control information in the received relayed preamble messages. Specifically, at a step A3, the DeNB compares all received power control information fields for the relayed preamble MAC messages, and at a step A4 selects the MTC-RN with the best signal level to be the server for the MTC-UE in question.

If multiple power control information fields from different MTC-RNs indicate the best signal level (within a predetermined decibel range), then the base station selects between these at a step A5 by taking into account the number of associated terminal devices for each relay device. In particular, the base station then preferentially selects the relay device (of those having the best signal level) having the lower number of associated MTC-UEs (load balancing). Finally, at a step A6 the DeNB sends a serving relay indication with payload ACK to the selected MTC-RN, and payload NACK to all other MTC-RNs. This may be achieved by way of a new message 'Serving relay indication' MAC control element, which will indicate that the UE corresponding to the current RA-RNTI (and RAPID) will be controlled by the recipient MTC-RN of that message. A NACK indication will be sent to all other MTC-RNs. A possible realization for sending the NACK indication is via a group RN-RNTI mechanism. This means that the NACK indication would be targeted in some way to all MTC-RNs which originated a relayed preamble MAC message relating including the same RA-RNTI. A possible realisation for indicating a NACK to all associated MTC-RNs is therefore the use of a PDSCH allocation scrambled with that RA-RNTI. It is recognized that the selected MTC-RN would receive both an ACK and a NACK, so logically in this case the MTC-RN would interpret this to mean ACK. It should also be appreciated that the use of a group RNTI mechanism to address multiple MTC-RNs could be of more general applicability, and is not simply limited to the transmission of NACK messages.

A possible format for the 'Serving relay indication' MAC control element is shown in FIG. 12. This MAC control element comprises a Random Access Temporary Identifier (RA-RNTI) as contained in the relayed preamble MAC control element, a relay device indicating field (S) which is a 1 bit field with '1' indicating that the relay device is the serving node and '0' indicating it is not the serving node, a RACH preamble ID part (RAPID) as contained in the relayed preamble MAC control element, and a reserved part (R).

Once an MTC-RN has been selected as a serving MTC-RN for a given MTC-UE (either because it was the only MTC-RN to relay the random access preamble or because DeNB arbitration selected it to be the serving relay node out of two or more candidates) then an entry for that MTC-UE will be made in a list of served MTC-UEs stored at the MTC-RN. The list would include the C-RNTI of the MTC-UE (used to identify and access communications between the DeNB and the MTC-UE), as well as some form of power control context information. This power control context information could include a target channel interference between the MTC-RN and the MTC-UE so that TPC (Transmit Power Control) commands can be generated.

For the MTC case it is reasonable to assume that UEs will have a low mobility, and so once the UE has connected via the MTC-RN it will stay associated with the same MTC-RN. For the mobility case a UF (e.g. non-MTC) can be added to the list when the DeNB informs the MTC-RN that it has been selected. The UE can be removed from the list when the UE disconnects the RRC connection.

MAC Relaying

As part of uplink-only relaying operation the relay device receives MAC (Media Access Control) Protocol Data Units (PDUs) from the terminal device and adds a new header termed 'MAC relay header' to the MAC PDUs.

Figure 13:
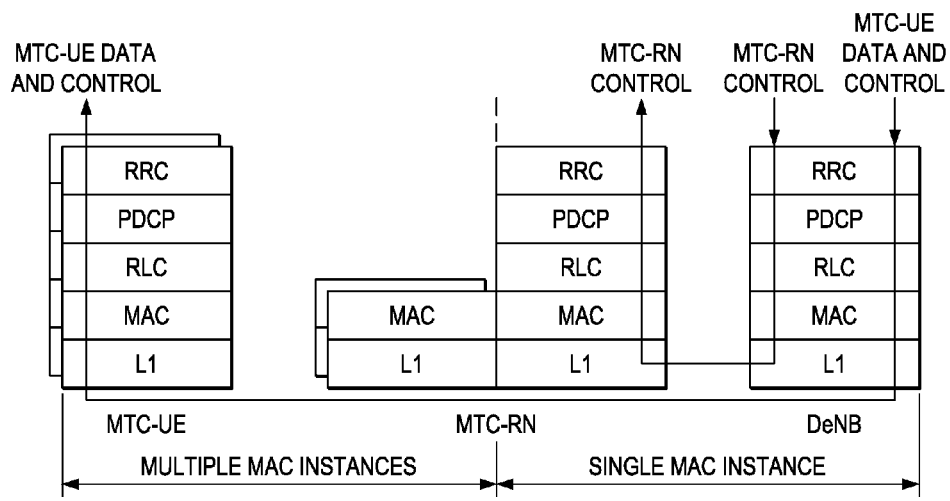
FIG. 13 schematically illustrates a protocol stack configuration and signal flow for a terminal device, relay device and base station for downlink signals.
Figure 14:
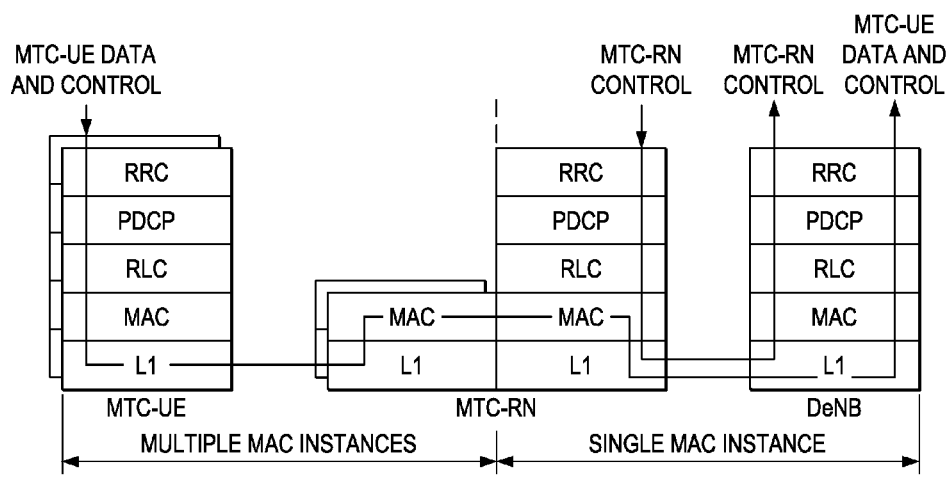
FIG. 14 schematically illustrates a protocol stack configuration and signal flow for a terminal device, relay device and base station for uplink signals.

Schematic illustrations of downlink and uplink end-to-end protocol stacks for uplink-only relaying are provided in FIGS. 13 and 14 respectively.

FIG. 13 illustrates the downlink (base station to terminal device) end-to-end protocol stack. Protocol stacks are shown at the terminal device (MTC-UE), the relay device (MTC-RN) and the base station (DeNB). The MTC-RN is shown with two protocol stacks, as both transmit and receive functions for the MTC-RN are shown. The MTC-RN is likely to communicate with only one DeNB, but may communicate with multiple MTC-UEs. In order to reflect this, the DeNB protocol stack and the right hand protocol stack in the MTC-RN (that is, the protocol stack used to communicate with the DeNB) are shown as single stacks (single instance), whereas a plurality of parallel protocol stacks are shown for the MTC-UE and the left hand protocol stack of the MTC-RN (that is, the protocol stack used to communicate with the MTC-UEs). The protocol stacks for the MTC-UE, the DeNB and the right hand stack of the MTC-RN have the following layers (from the highest layer to the lowest layer):

RRC (radio resource control);
PDCP (packet data convergence protocol);
RLC (radio link control);
MAC (medium access control); and
L1 (physical layer).

Control and data signalling for transmission from a transmitting device to a receiving device starts at a high layer (for example the RRC layer), is repeatedly transformed or processed through the various lower layers to the physical layer, and is then transmitted to the receiving device at the physical layer. At the receiving device the control signalling is received at the physical layer and then propagates up through the protocol stack typically to the layer at which it originated in the transmitting device, for example the RRC layer.

Two signal flows are shown in FIG. 13. The first of these is an MTC-UE data and control signal flow from the DeNB to the MTC-UE. This propagates down through the protocol stack at the DeNB and is transmitted directly to the MTC-UE at the physical layer (L1). As will be understood, downlink transmission from the DeNB to the MTC-UE is carried out directly, and not via the MTC-RN. The MTC-UE data and control signal flow, when received at the MTC-UE, propagates back up through the protocol stack at the MTC-UE. The second signal flow is an MTC-RN control signal flow from the DeNB to the MTC-RN. This propagates down through the protocol stack at the DeNB and is transmitted directly to the MTC-RN at the physical layer (L1). The MTC-RN control signal flow, when received at the MTC-RN, propagates back up through the protocol stack at the MTC-RN. For the downlink case, the left hand protocol stack at the MTC-RN (used for communicating with the MTC-UE) is not utilised, because the MTC-RN is not used to communicate with MTC-UEs on the downlink.

FIG. 14 illustrates the uplink (terminal device to base station) end-to-end protocol stack. Protocol stacks are shown at the MTC-UE, the MTC-RN and the DeNB in the same configuration as FIG. 13. Explanation of the layer structure will therefore not be repeated here. As with FIG. 13, multiple MAC instances are provided between the MTC-RN and a potential plurality of MTC-UEs.

Two signal flows are shown in FIG. 14. The first of these is an MTC-UE data and control signal flow from the MTC-UE to the DeNB. This propagates down through the protocol stack at the MTC-UE and is transmitted to MTC-RN at the physical layer. The control signal flow then propagates up to the MAC layer in the MTC-RN, where it is processed at the MTC-RN (in a manner to be described below) and then propagated back down to the physical layer and retransmitted to the DeNB at the physical layer. At the DeNB the MTC-UE data and control signalling propagates back up through the protocol stack. It will be appreciated from this that the MTC-UE data and control signalling is processed at the MTC-RN at the MAC layer. For this reason, the upper portion of the protocol stack for receiving data from the MTC-UE can be omitted, permitting simplification of the MTC-RN. The second signal flow is an MTC-RN control signal flow from the MTC-RN to the DeNB. This propagates down through the protocol stack at the MTC-RN and is transmitted directly to the DeNB at the physical layer (L1). The MTC-RN control signal flow, when received at the DeNB, propagates back up through the protocol stack at the DeNB. It will therefore be appreciated that a full protocol stack is required at the MTC-RN for controlling the communications link between the MTC-RN and the DeNB.

From FIGS. 13 and 14 it will be appreciated that processing is conducted at the MAC layer. In the MAC layer, data is communicated in MAC Protocol Data Units (PDUs) on the DL-SCH or the UL-SCH. Each MAC PDU comprises a MAC header, zero or more MAC Service Data Units (SDUs), zero or more MAC control elements, and optionally padding. The MAC header may consist of multiple sub-headers, each corresponding to one of a MAC control element, a MAC SDU, or padding. The sub-headers contain certain information describing the contents and size of the respective MAC control element, MAC SDU, or padding. The header and sub-headers may comprise an LCID (Logical Channel Identifier) field which indicates either a logical channel for a corresponding MAC SDU, or a type of the corresponding MAC control element. In FIGS. 13 and 14, MAC PDUs (of various different types) are transmitted from the MTC-UE and the MTC-RN on the uplink, between the MTC-RN to the DeNB on the uplink and downlink, and between the DeNB and the MTC-UE on the downlink.

When a MAC PDU is transmitted from the MTC-UE to the MTC-RN, the MTC-RN adds the new 'MAC relay header' to the MAC PDUs (which could at this stage be considered to be SDUs because they serve as an input into MAC layer processing) and transmits the resulting MAC relayed PDU to the DeNB. This is schematically illustrated in FIG. 15. In FIG. 15, an MTC-UE 310 transmits a MAC PDU 315 to an MTC-RN 320. At the MTC-RN 320, the received unsegmented MAC PDU 315 is provided with a relay header 323 which identifies the MTC UE 310 (UE identifier—for example the C-RNTI) and provides timing advance (TA) and power control information (typically a TPC decision). The timing advance information is derived by the MTC-RN based on a propagation time delay of the transmission from the MTC-UE to the MTC-RN. Similarly, the power control information is derived by the MTC-RN based on the reception power level of the transmission from the MTC-UE to the MTC-RN. The timing advance and power control information are required by the MTC-UE in setting a transmission time and transmission power of a subsequent transmission to the MTC-RN. This information cannot be provided directly from the MTC-RN to the MTC-UE because the MTC-RN does not communicate with the MTC-UE on the downlink (uplink-only relay). In order that the MTC-UE can ultimately be provided with this information, it is specified in the relay header 323. Conventional R/R/E/LCID/F/L and R/R/E/LCID elements (see section 6.1.2 of TS 36.321) may be used to indicate the existence of the MAC relay header control element and the size of the associated encapsulated MAC PDU from the MTC-UE. In addition, conventional MAC control elements 322 such as BSR (buffer status report) can be added, as defined in TS 36.321. It should be noted that a new LCID value for the MAC relay header may also be required. It should also be noted that the received MAC PDU from the MTC-UE becomes a MAC SDU in the MTC-RN (encapsulation), and that multiple MAC PDUs from a plurality of MTC-UEs can be transmitted in a single MAC PDU from the MTC-RN. Thus concatenation is possible; however segmentation of MAC PDUs from MTC UEs may not be.

To explain the difficulty in providing segmentation at the MTC-RN, it should be understood that, at an MTC-UE, physical resources are allocated for transmitting uplink data, and these physical resources represent a certain number of data bits that can be transported.

At the MTC-UE, the MAC layer determines, once headers have been taken into account, the amount of data that can be placed in the allocated resources and it asks the upper layer (which is the RLC) for a packet of this size (this would be referred to as a MAC SDU or RLC PDU, an SDU being the input to a layer while the PDU is the output of a layer). The RLC is responsible for splitting buffered packets into usually smaller (but not necessarily so) packets that are to be transmitted over the air interface. If big packets are being split into smaller packets then this is referred to as segmentation. As will be appreciated from the above, this is conventionally carried out by the RLC. Once this data has arrived at the MAC layer it will match (in size) the allocation and can then be transmitted on the uplink.

The problem for the MTC-RN at MAC level is that there is no means of performing segmentation at the MAC layer (and we have no RLC layer to do this job for us), and so what could happen is illustrated in the following simple example:

The MTC-RN receives 2 MAC PDUs from UEs that are to be relayed on to the DeNB. Each of them is 100 bits in size and they are from separate UEs. The MTC-RN informs the DeNB of it's buffer occupancy—200 bits. There is no obligation for the DeNB to grant an allocation which will transfer all of this data no an allocation of 190 bits may for example be made. We have no means of segmentation at the MAC layer, so the only option the MTC-RN has is to send one of the MAC PDUs that need to relayed and waste the rest of the allocation. The situation could be even worse if the DeNB grants an allocation of less than 100 bits, because the MTC-RN is then unable to transmit anything.

If this were to be a major problem then it would be possible to provide new functionality in MAC specifically for relay nodes that provides segmentation functions. However, this would result in an undesirable increase in complexity, and would have little advantage over relaying instead at the RLC level.

However, the lack of segmentation functionality at the MTC-RN may not be unduly problematic because:

(1) The radio link between the MTC-RN and the DeNB is likely to be much better than that between the MTC-RN and the MTC-UE. So it's relatively unlikely that a scenario where the MTC-RN can send less data than the MTC-UE has sent to the relay DeNB would arise; and (2) The scheduler in the DeNB is aware that the MTC-RN is a relay node and it can have a reasonable idea of the size of the PDUs that are to be relayed by the MTC-RN (because it has previously allocated resources for these PDUs to MTC-UEs being served by the MTC-RN). Accordingly, the scheduler can allocate the MTC-RN a high priority and allocate uplink resources to the MTC-RN such that the inefficiency discussed above does not occur, or is at least mitigated.

The MTC-RN will always send a MAC relay header control element even if it fails to receive the MAC PDU from the MTC-UE. This mechanism provides an implied ACK/NACK to the DeNB. It will be appreciated that the MTC-RN will be aware that a MAC PDU from an MTC-UE has failed to arrive because it is aware that uplink resources have been allocated to the MTC-UE, and so can expect an uplink transmission from the MTC-UE at a particular time and frequency resource.

The MAC PDU 315 from the UE, the relay header 323 and the conventional MAC control elements 322 together make up a MAC relayed PDU 325 which is transmitted from the MTC-RN 320 to the DeNB 330.

At the DeNB 330 the following processing occurs:

The DeNB 330 receives the relayed MAC PDU 325 and acts as if this was normally received from a conventional UE In particular, at a MAC processor 332. ACK/NACK indications are obtained in relation to the MTC-RN 320, TPC commands are generated in relation to the MTC-RN 320, and in the MAC layer the MAC control elements 322 are acted on. It will be appreciated that these parameters and actions are directed at the MTC-RN 320.

At the DeNB 330, a relay demultiplexer 334 than uses the contents of the MAC relay header 323 to control timing advance control to the MTC UE 310. Also power control TPC commands are generated based on the power information contained in the header 323. ACK/NACK indications are based on the presence or absence of a MAC PDU 315 from the MTC UE 310 within the MAC relayed PDU 325. This could be determined directly, or from the contents of a P field in the MAC relay header, as explained below.

The relay demultiplexer 334 also extracts the MAC PDU 315 originally transmitted by the MTC-UE 310 from the MAC relayed PDU 325 and returns this to the MAC processor 332 for processing. The C-RNTI contained in the MAC relay header control element is used to identify the UE context in the MAC for processing the MAC PDU 315. Regular processing of the MAC PDU 315 then occurs and ultimately a MAC SDU 338 corresponding to the data originated from the MTC-UE 310 is sent to higher layers of the protocol stack.

A suggested format for the MAC relay header control element is shown in FIG. 16. In FIG. 16, C-RNTI is the relayed UE's C-RNTI, TPC is the TPC decision made at the relay device for the MTC UE, TA info is the timing advance info obtained at the relay device for the MTC UE, and P indicates the presence or absence of an associated MAC PDU. If the associated MAC PDU was received correctly then this bit will be set to '1' and the MAC PDU will be present in the payload of the MAC relayed PDU (i.e. there was a ACK). If set to '0' then no MAC PDU is present (i.e. there was a NACK).

An example of the new MAC relayed PDU structure is shown schematically in FIG. 17 for a case where all of the scheduled transmissions from the MTC-UEs are correctly received by the MTC-RN.

A MAC header 410 of the PDU comprises a number of sub-headers 412, 414 and 416. The sub headers 412 correspond to respective control elements 420, 430 in the MAC payload. The sub headers 414 correspond to SDUs 440 in the MAC payload, and the sub head 416 corresponds to optional padding 450 within the MAC payload. Generally, the MAC header 410 is as currently defined in the LTE specification except that a new LCID value is available for use in R/R/E/LCID subheaders 412 so that associated MAC relay header control elements 430 can be signalled. The MAC control elements should preferably be ordered as follows:

Conventional MAC control elements 420 should be specified first. Note that in FIG. 17 m conventional control elements 420 are provided.

MAC relay header control elements 430 should be placed after the conventional MAC control elements 420. There will be a MAC relay control element 430 for each MAC PDU to be relayed and the order of the MAC relay header control elements 430 will be the same as the order of the MAC PDUs to be relayed (for this case where all P fields are set to '1'). Note that in FIG. 17 there are n MAC relay header control elements 430 and n MAC PDUs to be relayed.

If a single MAC relayed PDU contains multiple received MAC PDUs from the same MTC-UE then the first received should be the first in the overall constructed MAC relayed PDU, the second the second and so on.

The MAC SDUs 440 in FIG. 17 are actually MAC PDUs that have been received by the MTC-RN 320 and are to be relayed (they contain a MAC header, MAC control elements and a MAC SDU which has been transmitted from the MTC-UE 310). Note that in FIG. 17 there are n MAC SDUs 440.

As can been in FIG. 17 there are multiple MAC SDUs 440 in the constructed MAC relayed PDU. As discussed above each one of the these MAC SDUs 440 is in fact a MAC PDU transmitted from a MTC-UE and received by the MTC-RN. These can come from either a single UE (where the received MAC PDUs have been stored over multiple transmission time intervals (TTI)) or from multiple different UEs. Thus a form of concatenation of multiple MAC PDUs from MTC-UEs to form a single MAC relayed PDU is possible. However it should be noted segmentation of the MAC PDUs received from MTC-UEs may not be possible.

Figure 18:
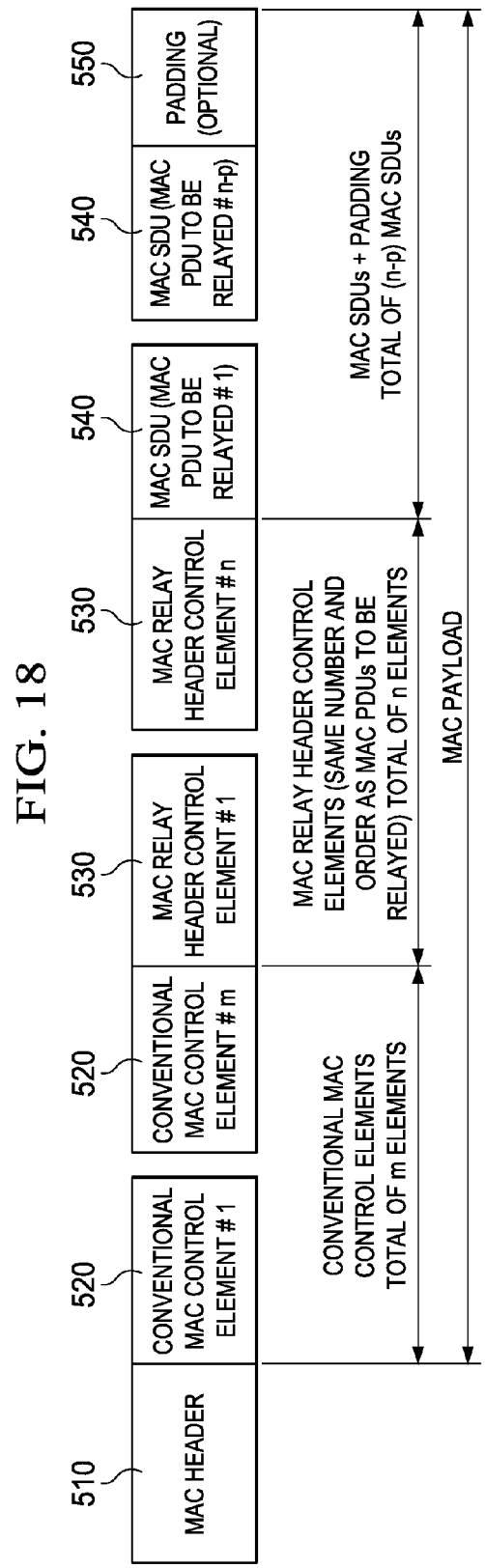
FIG. 18 schematically illustrates an example MAC relayed PDU in which some of the indicated MTC-UE MAC PDUs are not present.

An example of the new MAC relayed PDU structure is shown schematically in FIG. 18 for a case where some of the scheduled transmissions from the MTC-UEs are not correctly received by the MTC-RN. A scheduled transmission may be considered as not correctly received if either it is not received at all, or if it was incorrectly received (corrupted or incomplete).

In FIG. 18, there are still n MAC relay headers in a MAC header 510, because the MTC-RN is reporting on the same number of scheduled MTC-UE transmissions. As with FIG. 17, a set of conventional MAC control elements 520 are present, as are a set of MAC relay headers 530, MAC SDUs 540 and optional padding 550. In FIG. 18, some of the MAC relay header control elements 530 have their P field set to '0' to indicate that a MAC-PDU was not correctly received for an associated UL grant. It is assumed that there are p of these cases. For a MAC relay header control element 530 with P field set to '0' there is no associated MAC SDU. Thus the total number of MAC SDUs 540 (MAC PDUs actually received from MTC-UEs) is n-p. The order of the MAC relay headers 530 which have P set to '1' should correspond correctly with the MAC SDUs 540 contained in the MAC relayed PDU. Again, if a single MAC relayed PDU reports on multiple MAC PDU from a single MTC-UE, the order of the MAC relay control elements and the associated MAC SDUs (although these might not all be present) should be in order that they are scheduled to be received.

A suggested new LCID for the MAC relay header control element is shown highlighted in table 1 below (the non-highlighted values are the values currently defined in the LTE specification).

TABLE 1

A suggested new LCID for the MAC relay header control element.

| Index | LCID values |
| --- | --- |
| 00000 | CCCH |
| 00001-01010 | Identity of the logical channel |
| 01011-11000 | Reserved |
| 11001 | MAC relay header |
| 11010 | Power Headroom Report |
| 11011 | C-RNTI |
| 11100 | Truncated BSR |
| 11101 | Short BSR |
| 11110 | Long BSR |
| 11111 | Padding |

Relay Control

Figure 19:
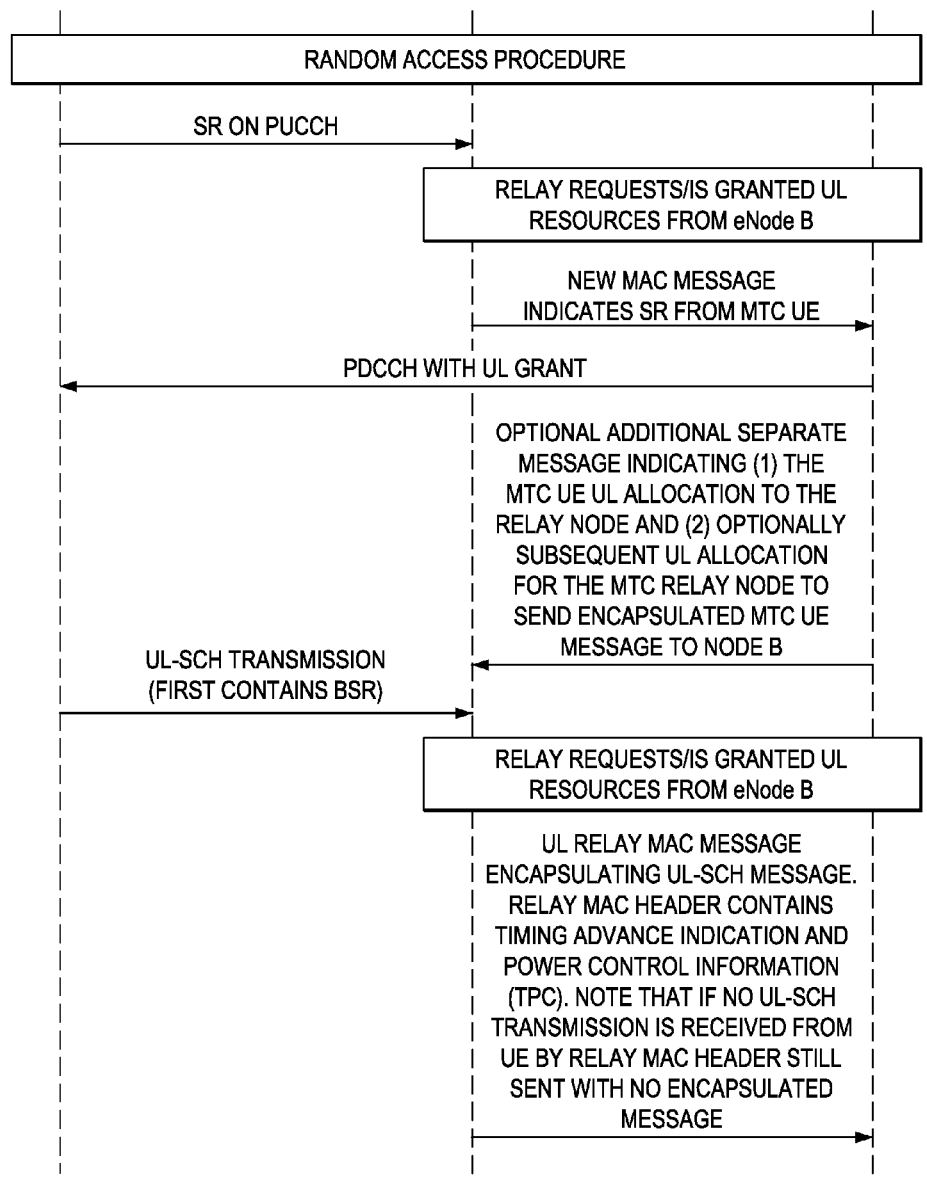
FIG. 19 schematically illustrates an example procedure for communicating between a terminal device and a base station via a relay device for uplink communications.

A procedure for handling the relaying of UE data by the relay following the random access procedure is now described with reference to FIG. 19. When an MTC-UE wishes to send data to a DeNB it transmits a Scheduling Request (SR) on the PUCCH on a previously allocated time/frequency resource. This is typically a single bit (transmitted or not transmitted) within the allocated time/frequency resource. The DeNB is responsive to receiving the SR to allocate and signal an uplink grant to the MTC-UE.

Request for Resource from the MTC-UE

If no PUCCH (Physical Uplink Control Channel) resources have been assigned to the UE then it will need to conduct a random access procedure, this is described above in detail and indicated in FIG. 19.

Once the random access procedure is complete the MTC-UE sends a SR (Scheduling Request) on the allocated PUCCH resource. The MTC-RN will have been informed of the PUCCH resources that the MTC-UE has been allocated and attempts to receive PUCCH transmissions at these instances. Two mechanisms by which the MTC-RN could be made aware of the PUCCH resources allocated to the MTC-UE are as follows:

(1) Directly after the random access procedure, the PUCCH resources will have been assigned to the MTC-UE in an RRCConnectionSetup RRC message which is sent unencrypted by the DeNB. It is therefore possible for the MTC-RN to monitor the PDCCH and the PDSCH for this RRC message and use the configuration information provided by this message to set up to receive a PUCCH transmission from the MTC-UE; or (2) A new RRC message could be used to inform the relay node of the PUCCH resource assigned to the MTC-UE it is serving. The new RRC message could be transmitted directly to the MTC-RN by the DeNB, for example on the PDCCH and/or the PDSCH. The advantage of this option over the first option is that with the first option if the PUCCH is reconfigured then the MTC-RN may not be able to determine this because subsequent RRC messages are encrypted.

When a PUCCH transmission is received by the MTC-RN in relation to an MTC-UE for which it is responsible, it generates a new MAC control element 'Relayed SR message' which contains a C-RNTI of the MTC-UE. Note that the MTC-RN may request and be granted uplink resources in order to send the relayed SR message to the base station in the same way as a conventional UE. It will be appreciated that there are other options for relaying the SR to the base station, for example using physical layer (L1) signalling, noting that the SR is generally a single 1 bit flag. The DeNB is responsive to the SR to allocate uplink resources to the MTC-UE. This uplink grant is communicated directly to the MTC-UE on the PDCCH. As will be explained further below, there may also be an optional additional separate message indicating (1) the MTC-UE uplink allocation to the relay device and (2) a subsequent uplink allocation for the MTC-RN to use in sending the encapsulated MTC-UE message to the DeNB.

General Mechanism for Relaying Uplink MAC PDUs from the MTC-UE

The general mechanism for relaying uplink MAC PDUs from the MTC-UE is now described. In FIG. 19 the BSR (Buffer Status Report) is transferred (this is the standard case for a first transmission after the SR in order to advise the DeNB how much data there is to send on the uplink and thus how much future uplink resource is to be required) but embodiments of the present invention apply similarly to user plane data.

There are a number of possible options described below; each depends on the level of inference (and the amount of signalling) that is made at the MTC-RN.

Figure 20:
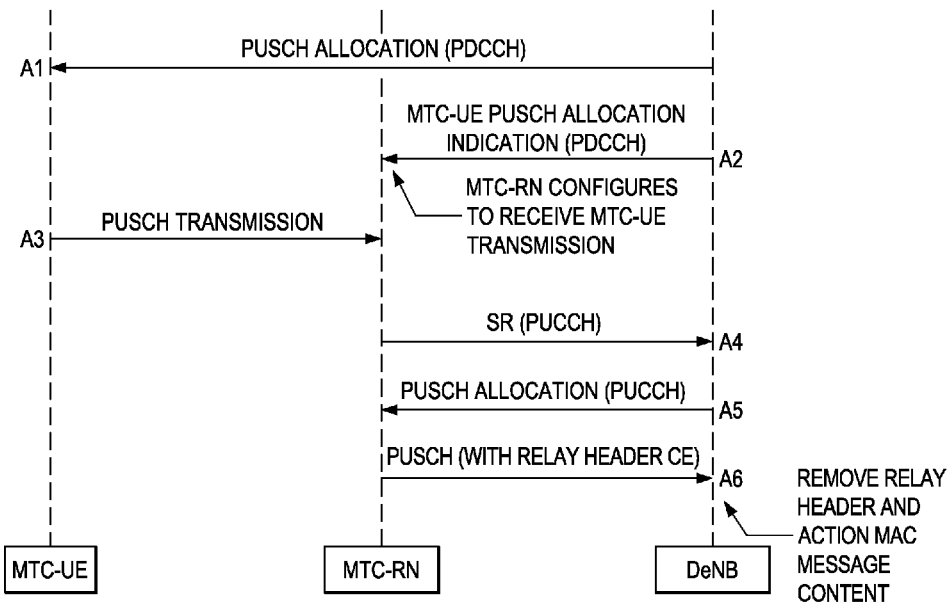
FIG. 20 schematically illustrates a first technique for the relay device to become aware of uplink resources to use for receiving a message from a terminal device, and for relaying the received message to a base station.

Option 1: Separate PDCCH Grant to MTC-UE and Indication of this Grant to the MTC-RN with no Implied Grant to MTC-RN In this case the following procedure occurs, as shown in FIG. 20:

At a step A1, a grant of UL resources is made to the MTC-UE and communicated on the PDCCH. At around the same time, at a step A2, a separate grant is made to the MTC-RN which is different from a conventional grant because it does not actually allocate PUSCH resources but informs the MTC-RN that the MTC-UE has been allocated PUSCH resources. This allows the MTC-RN to configure its receiver appropriately. Note that this grant can take one of 2 forms:

1. A new PDCCH format which contains a modified uplink grant (certain parameters such as new data indicator are not needed) and a mechanism to indicate the UE that the allocation is being made to; or
2. A conventional PDCCH grant of downlink resources to the MTC-RN is made and a new MAC control element is sent to the MTC-RN on the subsequent PDSCH transmission which indicates the uplink resources which have been sent to the UE in question (identified by its C-RNTI). This mechanism is similar to the MAC random access response procedure, although there is no actual uplink grant to the MTC-UE, just an indication that a grant has been made to a particular UE.

At a step A3, the MTC-UE transmits on the PUSCH in the granted resources and this is received by the MTC-RN (the DeNB does not receive this PUSCH transmission). At a step A4, the MTC-RN acts in the same way as a UE with data newly arrived in its buffers and requests from the base station, and is subsequently granted (at a step A5), UL resources. At a step A6, the MTC-RN adds an uplink relay MAC header (see above), which contains power control and timing advance information, to the received MAC PDU from the MTC-UE and transmits this to the base station in the allocated resources. Note also that if the MTC-RN did not receive the MAC PDU from the MTC-UE the MTC-RN still sends an uplink relay MAC header but with no encapsulated MAC message from the MTC-UE. Following the step A6, the DeNB receives the data and a new MAC sub-layer is used to remove the header and determine the MTC-UE from which it ultimately came. Note that there is also timing advance and power control information in the MAC header. ACK/NACK is implied from the presence or absence of the encapsulated MAC message from the MTC-UE (possibly based on a "presence" bit in header information of the MAC message).

Figure 21:
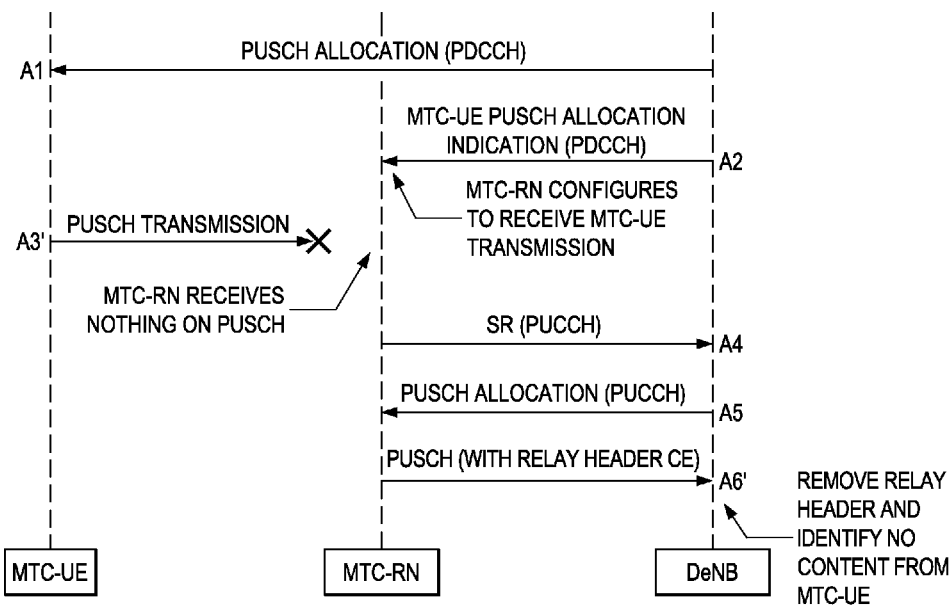
FIG. 21 schematically illustrates how the relay device behaves in the first technique when the message from the terminal device is not received.

FIG. 21 repeats the process of FIG. 20, but schematically illustrates how the process is modified when the PUSCH transmission from the MTC-UE is not received at the MTC-RN. In particular, the steps A1, A2, A4 and A5 are identical to the identically numbered steps in FIG. 20, and will therefore not be described again. A step A3' differs from the step A3 in FIG. 20 because the transmission on PUSCH never reaches the MTC-RN (or alternatively arrives incomplete or corrupted). In this case, the MTC-RN still requests resources and sends a PUSCH transmission to the base station, but in this case there is no MTC-UE originating content included in the PUSCH transmission. This procedure effectively informs the base station that the scheduled transmission from the MTC-UE has failed.

Option 2: Single PDCCH Grant to MTC-UE with No Implied Grant to MTC-RN

Figure 22:
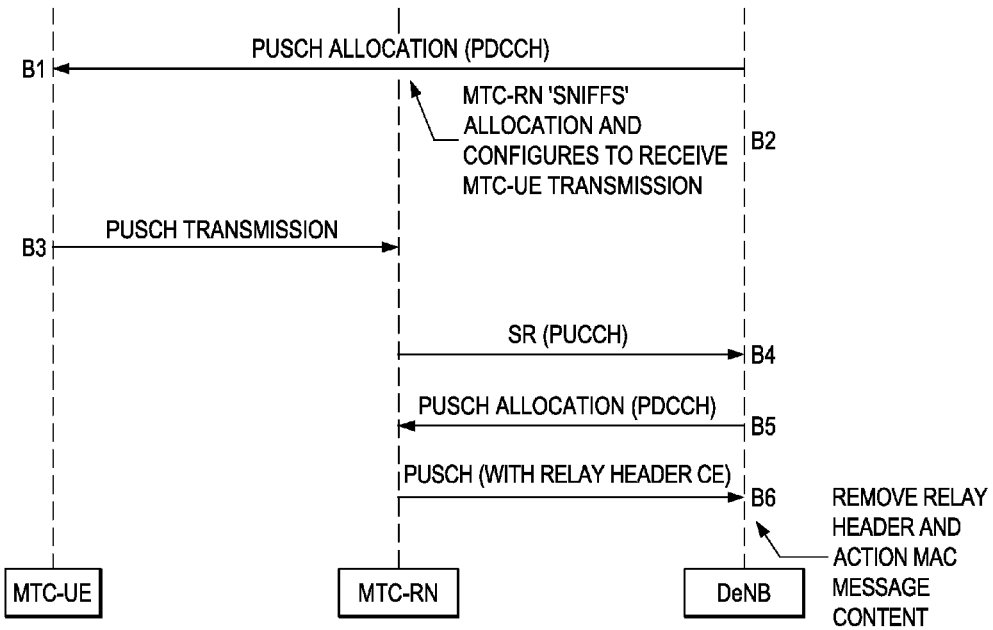
FIG. 22 schematically illustrates a second technique for the relay device to become aware of uplink resources to use for receiving a message from a terminal device, and for relaying the received message to a base station.

In this case the following procedure occurs, as shown in FIG. 22:

At a step B1, a grant of UL resources is made to the MTC-UE and communicated to the MTC-UE on the PDCCH. No separate indication of these granted resources is sent to the MTC-RN. The MTC-RN is required to monitor the PDCCH to detect messages associated with this MTC-UE (at a step B2). The MTC-RN is able to achieve this by performing a CRC (Cyclic Redundancy Check) mask on the PDCCH not only for its own C-RNTI (standard technique for a device to obtain PDCCH data intended for it), but also for the C-RNTI of the MTC-UE, which the MTC-RN is aware of (for example via the Random Access Response described above). In this way, the MCT-RN is able to identify that a grant has been provided to the MTC-UE and configure its receivers appropriately. The rest of the procedure is as defined in Option 1, with steps B3, B4, B5 and B6 corresponding to the steps A3, A4, A5 and A6 of FIGS. 22 and 23, the description of these therefore not being described here.

Figure 23:
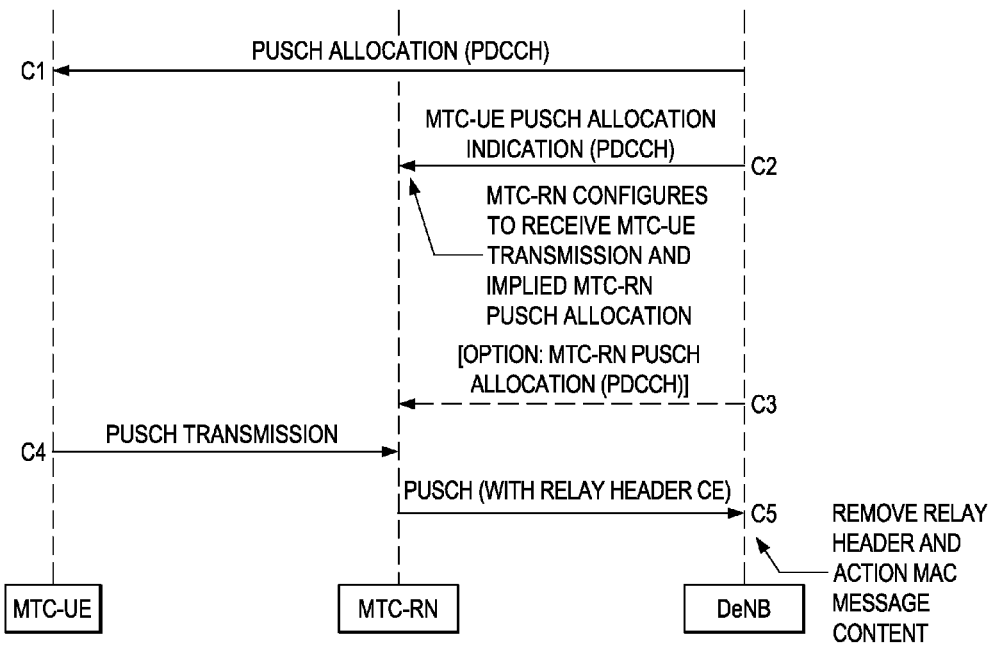
FIG. 23 schematically illustrates a third technique for the relay device to become aware of uplink resources to use for receiving a message from a terminal device, and for relaying the received message to a base station.

Option 3: Separate PDCCH Grant to MTC-UE and Indication of this Grant to the MTC-RN with Implied Grant to MTC-RN In this case the following procedure occurs, as shown in FIG. 23:

As in Option 1 a grant of UL resources is made to the MTC-UE and transmitted on the PDCCH at a step C1. As in option 1 a separate grant is made to the MTC-RN at a step C2, which is different from a conventional grant because it does not actually allocate PUSCH resources but informs the MTC-RN that the MTC-UE has been allocated PUSCH resources. This allows the MTC-RN to configure its receiver appropriately. As in option 1 the MTC-UE transmits on PUSCH in the granted resources at a step C4, and this is received by the MTC-RN (the DeNB does not receive this PUSCH transmission). In contrast to Option 1, the reception of the message by the MTC-RN in step C4 implies a UL grant of resource in a later subframe (or also contains an additional explicit indication) to be used by the MTC-RN to send data to the DeNB. As an option, the base station may (at a step C3), transmit an MTC-RN PUSCH allocation message on the PDCCH to allocate uplink resources to the MTC-RN for relaying the subsequent PUSCH transmission at the step C4.

At a step C5, the MTC-RN adds an uplink relay MAC header (see below) to the received MAC PDU from the MTC-UE and transmits this in the allocated resources. Note also that if the MTC-RN did not receive the MAC PDU from the MTC UE it still sends a UL relay MAC header but with no encapsulated MAC message from the MTC-UE. Following the step C5, the DeNB receives the data and a new MAC sub-layer is used to remove the header and determine the MTC-UE from which it ultimately came. Note that there is also timing advance and power control information in the MAC header. ACK/NACK is implied from the presence or absence of the encapsulated MAC message from the MTC-UE.

Option 4: Single PDCCH Grant to MTC-UE with Implied Grant to MTC-RN

Figure 24:
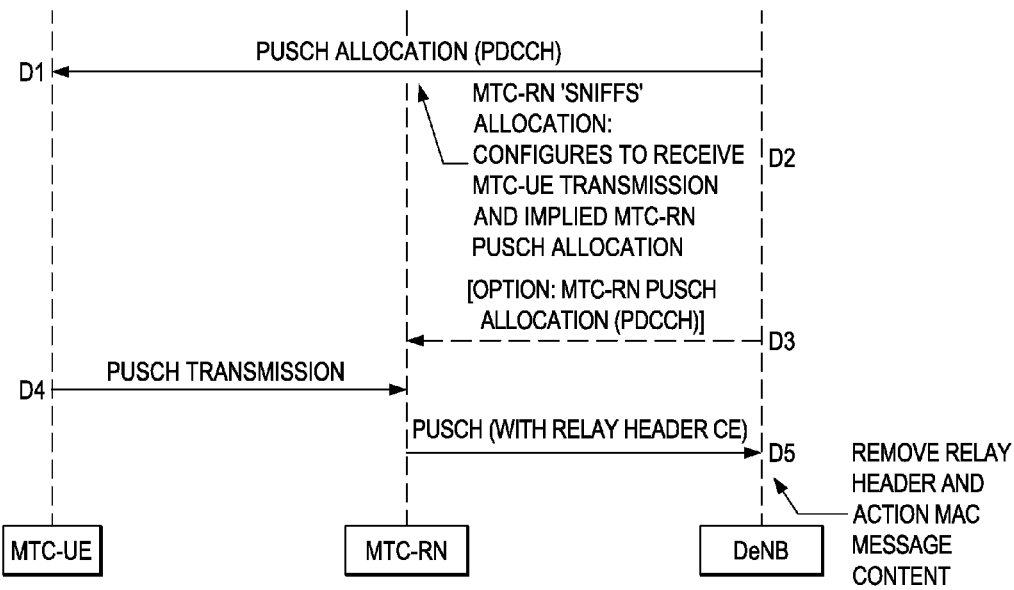
FIG. 24 schematically illustrates a fourth technique for the relay device to become aware of uplink resources to use for receiving a message from a terminal device, and for relaying the received message to a base station.

In this case the following procedure occurs, as shown in FIG. 24:

As in option 2 a single grant of UL resources is made to the MTC-UE and transmitted on the PDCCH at a step D1, which the MTC-RN also receives by monitoring the PDCCH at a step D2. There is an implied allocation in a later subframe based on this the reception of an allocation to a MTC-UE which the MTC-RN knows it is responsible for forwarding data to the DeNB. Subsequent steps D3 (which is optional), D4 and D5 correspond to the steps C3. C4 and C5 in Option 3, the description of these therefore not being repeated here.

Comparison of Options

The benefits of Option 1 are as follows:

The use of separate PDCCH messages for informing the MTC-RN of the uplink grant to the MTC-UE mean that the MTC-RN is not forced to monitor the PDCCH to see where the MTC-UE UL grants are made but is informed directly.

The MTC-RN requests and is allocated explicit resources to send data from it to the DeNB. This has the advantage that it is much easier to operate efficient rate control for relaying transmissions from the MTC-RN. In particular, the MTC-RN will request only the uplink resources it needs to relay the messages actually received from the MTC-UE. Also, requesting resources from the base station improves the ease of concatenating MAC PDUs from multiple MTC-UEs into a single transmission.

The disadvantages of Option 1 are as follows:

A new allocation mechanism would be required, for example similar to a RAR which indicates the C-RNTI of the MTC-UE and the uplink grant to inform the MTC-RN of allocations to the MTC-UE.

The MTC-UE has no implied allocation of resources for it to send data back up to the DeNB, which gives rise to a delay penalty.

The benefits of option 2 are as follows:

No separate indication is required to be sent to the MTC-RN to indicate that the MTC-UE has been granted uplink resources. This is more efficient than the communication of explicit indications.

The MTC-RN requests and is allocated explicit resources to send data from it to the DeNB. This has the advantage that it is much easier to operate efficient rate control for relaying transmissions from the MTC-RN. In particular, the MTC-RN will request only the uplink resources it needs to relay the messages actually received from the MTC-UE. Also, requesting resources from the base station improves the ease of concatenating MAC PDUs from multiple MTC-UEs into a single transmission.

The disadvantages of Option 2 are as follows:

The MTC-RN is required to look at PDCCH messages not intended for it and for it to set up its receivers to receive the indicated uplink resources.

The MTC-UE has no implied allocation of resources for it to send data back up to the DeNB, resulting in a delay penalty.

The benefits of Option 3 are as follows:

The use of separate PDCCH messages for informing the MTC-RN of the uplink grant to the MTC-UE mean that the MTC-RN is not forced to monitor the PDCCH to see where the MTC-UE UL grants are made but is informed directly.

The MTC-RN implies an uplink grant from the indication that it is to receive data from the MTC-UE. This is more efficient in terms of signalling and reduces delay.

The disadvantages of Option 3 are as follows:

A new allocation mechanism would be required, for example similar to a RAR which indicates the C-RNTI of the MTC-UE and the uplink grant to inform the MTC-RN of allocations to the MTC-UE.

It would be difficult to run an efficient rate control function and if the MTC-RN fails to receive the transmission from the MTC-UE there will only be the small relay header to send—this might require for less resources than actually allocated by the base station.

The benefits of Option 4 are as follows:

No separate indication is required to be sent to the MTC-RN to indicate that the MTC-UE has been granted uplink resources. This is more efficient than the transmission of explicit indications.

The MTC-RN implies an uplink grant from the indication that it is to receive data from the MTC-UE. This is clearly more efficient in terms of signalling and reduces delay.

The disadvantages of Option 4 are as follows:

The MTC-RN is required to look at PDCCH messages not intended for it and for it to set up its receivers to receive the indicated uplink resources.

It would be difficult to run an efficient rate control function and if the MTC-RN fails to receive the transmission from the MTC-UE there will only be the small relay header to send—this might require far less resources than actually allocated by the base station.

Overall option 2 probably offers the best choice for MTC devices in an LTE network, but as can be appreciated from the above all of the options have their relative merits.

Figure 25:
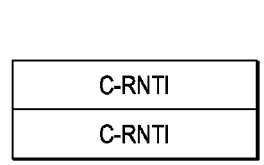
FIG. 25 schematically illustrates an example implementation of the relayed scheduling request (SR)

The discussion above highlighted the need for a mechanism to relay scheduling requests (SR) received on PUCCH by the MTC-RN to the DeNB. This is achieved by the use of a new MAC control element, the 'relayed SR' MAC control element. A proposed structure for this MAC control element is shown in FIG. 25. The relayed SR needs only indicate the MTC-UE's C-RNTI (the LCID in the MAC header will tell the DeNB this is a relayed SR and thus a small uplink allocation is needed to send a BSR).

The new PDCCH approach may use a cut down version of DCI format 0 (CQI request, TPC command and new data indicator are not required by the MTC-RN which is only performing reception of the allocated UL resources) together with a relayed UE identifier which is an index into a table which contains the actual C-RNTIs of the MTC-UEs that the MTC-RNs is tasked with relaying. This table is signaled to the MTC-RN by (preferably) RRC signalling. This will of course mean that RRC messaging is needed to configure the MTC-RN correctly.

Figure 26:
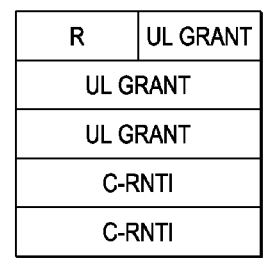
FIG. 26 schematically illustrates an example implementation of the new MAC control element for indicating to the MTC-RN on which uplink resources to expect a transmission from the MTC-UE.

An example implementation of a new MAC control element for indicating to the MTC-RN on which uplink resources to expect a transmission from the MTC-UE is schematically illustrated in FIG. 26 is termed an 'MTC-UE allocation' control element. The MTC-UE allocation control element is similar to the RAR format but needs its own LCID as it is used to inform the MTC-RN it must turn on its receivers to receive the indicated UL allocation from the MTC-UE. The MTC-UE allocation control elements comprises a C-RNTI field which specifies the C-RNTI of the MTC UE to which an uplink grant has been made. A field "UL grant" specifies the grant provided to the MTC-UE which the MTC-RN should setup to receive. The "R" field is Reserved.

Overall the PDCCH approach is preferable because it requires a single message whereas the new MAC control element approach means that two messages are needed, one of which is sent on the PDSCH which is potentially subject to a block error rate (BLER) target (because HARQ is operating on this channel).

Figure 27:
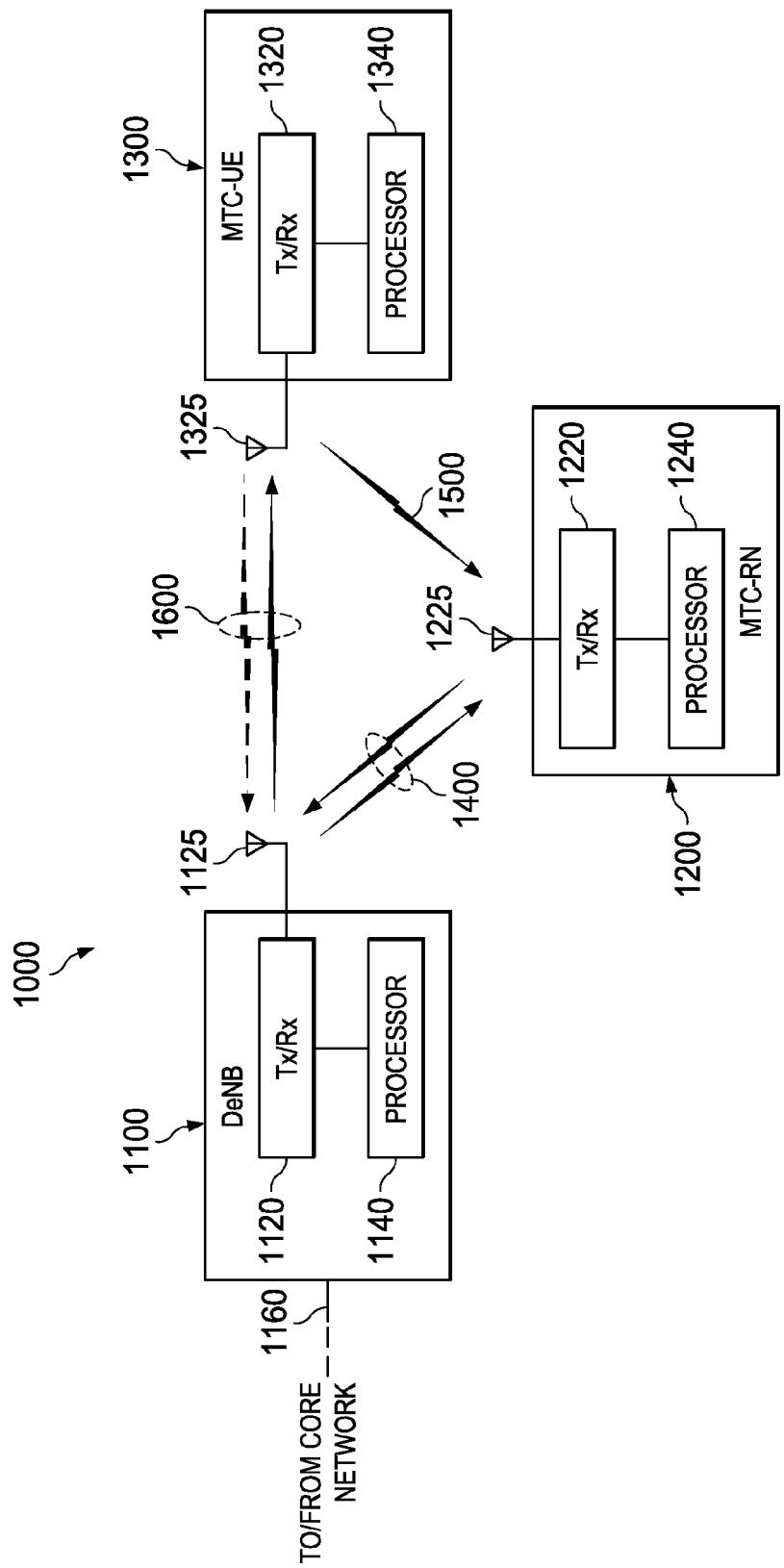
FIG. 27 schematically illustrates a wireless communications system comprising a DeNB, an MTC-RN and an MTC-UE.

In FIG. 27, a schematic diagram of a wireless communications system 1000 comprising a base station (DeNB) 1100, a relay device (MTC-RN) 1200 and a terminal device (MTC-UE) 1300 is shown. The DeNB 1100 comprises a transmitter/receiver part 1120 (transmitter and receiver) which transmits and receives data over an air interface using an antenna 1125. The DeNB 1100 also comprises a processor 1140 which controls the scheduling of communications over the air interface as well as coordinating the operation of the DeNB 1100 with the core network elements shown in FIG. 2 (not shown here). The DeNB 1100 is connected to the core network via a backhaul link 1160. The DeNB 1100 communicates in both the downlink and uplink direction with the MTC-RN 1200 over the air interface on a communication link 1400.

The MTC-RN 1200 comprises a transmitter/receiver part 1220 (transmitter and receiver) which transmits and receives data over an air interface using an antenna 1225. The MTC-RN 1200 also comprises a processor 1240 which controls the transmitter/receiver part 1220 in receiving and transmitting data over the air interface. The processor 1240 may also control the measurement of a received signal strength and propagation delay from the MTC-UE over the air interface, and is responsible for processing UE MAC PDUs into relayed MAC PDUs in the manner described above. The MTC-RN 1200 communicates in both the downlink and uplink direction with the DeNB 1100 over the air interface on a communication link 1400, and receives uplink transmissions from the MTC-UE 1300 over the air interface on a communications link 1500. The communications link 1500 is unidirectional (uplink only), because the MTC-RN 1200 does not transmit to the MTC-UE 1300.

The MTC-UE 1300 comprises a transmitter/receiver part 1320 (transmitter and receiver) which transmits and receives data over an air interface using an antenna 1325. The MTC-UE 1300 also comprises a processor 1340 which controls the transmitter/receiver part 1320 in receiving and transmitting data over the air interface. The processor 1340 may also control other functions related to the purpose of the MTC-UE 1300. For example, if the MTC-UE is a measurement device intended to report back measurements (e.g. temperature, or power usage) via the network, then the processor 1340 may be responsible for handling the taking and processing of these measurements, as well as for packaging the measurement data (into MAC PDUs) for transmission. The MTC-UE 1300 receives transmissions from the DeNB 1100 in the downlink direction on a communications link 1600 (solid arrow), and may transmit directly to the DeNB 1100 in the uplink direction on the communications link 1600 (dashed arrow) should it be within uplink transmission range. If the MTC-UE 1300 is out of range, then all uplink transmissions from the MTC-UE 1300 to the DeNB 1100 will be made via the MTC-RN 1200.

It will be appreciated that, while the present embodiment describes a single-hop relay situation, a multi-hop relay architecture could be similarly envisaged, with the DeNB controlling the scheduling of uplink resources at each link in a chain of for example MTC-UE→MTC-RN1→MTC-RN2→DeNB.

The above description is based on MTC devices operating within an LTE network. It will however be understood that the principles of the present invention are not limited to this, and may be applied to other networks and other classes of terminal device.

The invention claimed is:

1. A relay device for wirelessly relaying data from a terminal device to a base station, the relay device comprising:
   a receiver for receiving from the terminal device a message for relaying to the base station, wherein the message is a Medium Access Control (MAC) Protocol Data Unit (PDU); and
   a transmitter for adding a relay header and MAC control elements to the message received from the terminal device, the relay header comprising control information derived by the relay device based on the message received from the terminal device, the control information controlling subsequent transmissions of messages from the terminal device to the relay device to synchronize a receive time of the subsequent transmissions at the relay device with a receive time of transmissions from other terminal devices, and relaying the message, having the added relay header and the added MAC control elements, to the base station, wherein the relay device does not communicate with the terminal device on a down-link.

2. A relay device according to claim 1, wherein
   the receiver is operable to receive one or more subsequent messages from the terminal device based on the control information included in the relay header.

3. A relay device according to claim 1, wherein the relay device is operable to measure a received signal power of the message received from the terminal device; and
   to set power control information in the control information for controlling a power level of a subsequent transmission from the terminal device to the relay device.

4. A relay device according to claim 3, wherein the power control information specifies a power offset from the received signal power.

5. A relay device according to claim 1, wherein the relay device is operable to measure a propagation time delay between the terminal device and the relay device of the message transmitted from the terminal device to the relay device;
   to determine, based on the propagation time delay, a required timing advance offset for a subsequent transmission from the terminal device to the relay device; and
   to specify said timing advance offset in the control information.

6. A relay device according to claim 1, wherein the relay device is operable to transmit the relay header to the base station in relation to an expected message from the terminal device even if the expected message was not correctly received at the relay device.

7. A relay device according to claim 6, wherein the message from the terminal device is expected if uplink resources have been allocated to the terminal device by the base station.

8. A relay device according to claim 1, wherein the relay device is operable to combine a plurality of messages received from one or more terminal devices into a relay message, the relay header being added to the relay message and having a respective relay control element for each of the plurality of messages received at the relay device, each relay control element comprising the control information for controlling the transmission of subsequent messages from the terminal device originating the message to which the relay control element relates; and to transmit the relay message to the base station.

9. A relay device according to claim 1, wherein the relay header comprises an identification of the terminal device which transmitted the message.

10. A relay device according to claim 8, wherein an expected message from the one or more terminal devices includes the relay control element in the relay header even if the expected message is not correctly received at the relay device.

11. A relay device according to claim 10, wherein the relay control element comprises an indication of whether the associated message is present in the relay message.

12. A relay device according to claim 8, wherein the relay header comprises further control information for controlling the transmission of data between the relay device and the base station.

13. A relay device according to claim 8, wherein the relay control elements in the relay header are in the same order as the messages to which the relay control elements correspond.

14. A relay device according to claim 12, wherein the relay control elements in the relay header are positioned after the further control information.

15. A relay device according to claim 8, wherein when a plurality of MAC messages from the same terminal device are present in the relay message, the plurality of MAC messages are positioned within the relay message in the order in which the plurality of MAC messages were received at the relay device.

16. A relay device according to claim 1, wherein the relay device is operable to process and relay the message received from the terminal device at a MAC layer in a protocol stack.

17. A relay device according to claim 8, wherein the messages received at the relay device from the terminal devices are MAC PDUs;

the relay message is a MAC Protocol Data Unit; and
the base station is operable to process the MAC Protocol Data Unit of the relay message at the MAC layer in a protocol stack to extract a MAC Protocol Data Unit of the message from the terminal device;
to process the MAC Protocol Data Unit of the message from the terminal device at the MAC layer; and
to pass the processed MAC Protocol Data Unit of the message from the terminal device to a higher level in the protocol stack.

18. A terminal device for wirelessly communicating data to a base station via a relay device, the terminal device comprising:

a transmitter for transmitting a Medium Access Control (MAC) Protocol Data Unit (PDU) message to the base station via the relay device and transmitting subsequent messages to the relay device according to control information derived by the relay device based on the MAC PDU message received from the terminal device and included in a relay header added to the MAC PDU message by the relay device, wherein the relay device adds the relay header and MAC control elements to the MAC PDU message to form a MAC relayed PDU for transmission to the base station, wherein the terminal device is operable to receive from the base station the control information contained in the relay header of the MAC relayed PDU, and the relay device does not communicate with the terminal device on a down-link.

19. A terminal device according to claim 18, wherein the MAC PDU is unsegmented.

20. A terminal device according to claim 18, wherein the terminal device is responsive to power control information received from the base station to control the transmission power of a transmission to the relay device, the power control information being determined at the relay device based on a received signal power of the MAC PDU message received from the terminal device.

21. A terminal device according to claim 20, wherein the power control information specifies a power offset from the received signal power.

22. A terminal device according to claim 18, wherein the terminal device is responsive to a timing advance offset received from the base station to control the timing of a transmission to the relay device so that a receive time of the transmission at the relay device is synchronized with a receive time of transmissions from other terminal devices, the timing advance offset being determined at the relay device from a propagation time delay between the terminal device and the relay device of the MAC PDU message transmitted by the terminal device.

23. A method of wirelessly relaying data from a terminal device to a base station via a relay device, comprising:

receiving from the terminal device a Medium Access Control (MAC) Protocol Data Unit (PDU) message for relaying to the base station;
deriving control information for controlling the transmission of subsequent messages from the terminal device to the relay device based on the MAC PDU message received from the terminal device;
adding a relay header and MAC control elements to the MAC PDU message received from the terminal device to form a MAC relayed PDU, the relay header comprising the control information; and
relaying the MAC relayed PDU to the base station, wherein the relay device does not communicate with the terminal device on a down-link.

24. A method of wirelessly communicating data from a terminal device to a base station via a relay device, comprising:

transmitting a message from the terminal device to the base station via the relay device; wherein a relay header and control elements are added to the message received from the terminal device at the relay device to form a relayed message, the relay header comprising control information derived by the relay device based on the message received from the terminal device, the control information controlling subsequent transmissions of messages from the terminal device to the relay device to synchronize a receive time of the subsequent transmissions at the relay device with a receive time of transmissions from other terminal devices, the relayed message being relayed to the base station, wherein the relay device does not communicate with the terminal device on a down-link.

* * * * *

UNITED STATES PATENT AND TRADEMARK OFFICE
CERTIFICATE OF CORRECTION

PATENT NO. : 10,027,401 B2
APPLICATION NO. : 13/588955
DATED : July 17, 2018
INVENTOR(S) : Timothy James Speight and Paul William Piggin Page 1 of 1

It is certified that error appears in the above-identified patent and that said Letters Patent is hereby corrected as shown below:

In the Specification

In Column 14, Line 67, after --case a-- delete "UF" and insert --UE--

In Column 17, Line 48, after --this data-- delete "no" and insert --so--

In Column 18, Line 32, after --demultiplexer 334-- delete "than" and insert --then--

Signed and Sealed this
Twenty-eighth Day of August, 2018

Andrei Iancu
*Director of the United States Patent and Trademark Office*